US012502264B2

(12) United States Patent
Goldenberg et al.

(10) Patent No.: US 12,502,264 B2
(45) Date of Patent: Dec. 23, 2025

(54) INJECTION APPARATUS AND METHOD FOR USE

(71) Applicant: pHi-Tech Animal Health Technologies Ltd., Airport City (IL)

(72) Inventors: Gershon Goldenberg, Pardes Hanna-Karkur (IL); Asaf Halamish, Pardes Hanna-Karkur (IL); Jonathan M. Bendheim, Jerusalem (IL); Avner Finger, Pardes Hanna-Karkur (IL); Udi Ashash, Sede Nahum (IL)

(73) Assignee: phi-Tech Animal Health Technologies (IL)

( * ) Notice: Subject to any disclaimer, the term of this patent is extended or adjusted under 35 U.S.C. 154(b) by 938 days.

(21) Appl. No.: 17/492,010

(22) Filed: Oct. 1, 2021

(65) Prior Publication Data

US 2022/0023023 A1    Jan. 27, 2022

Related U.S. Application Data

(63) Continuation of application No. PCT/IB2020/053177, filed on Apr. 30, 2020.
(Continued)

(51) Int. Cl.
*A61D 7/00* (2006.01)
*A61M 5/14* (2006.01)
(Continued)

(52) U.S. Cl.
CPC ............. *A61D 7/00* (2013.01); *A61M 5/1408* (2013.01); *A61M 5/1411* (2013.01);
(Continued)

(58) Field of Classification Search
CPC ....... A61D 7/00; A61D 1/025; A61M 5/1408; A61M 5/1411; A61M 5/1413;
(Continued)

(56) References Cited

U.S. PATENT DOCUMENTS

| 4,276,879 A | 7/1981 | Yiournas |
| 4,673,395 A | 6/1987 | Philiips |

(Continued)

FOREIGN PATENT DOCUMENTS

| AU | 727855 | 3/1999 |
| CA | 2741441 | 2/2003 |

(Continued)

OTHER PUBLICATIONS

Office action for Chinese Application No. 201880029105.6, issued Dec. 28, 2021 (includes translation) (20 pages).
(Continued)

*Primary Examiner* — Theodore J Stigell
(74) *Attorney, Agent, or Firm* — Klarquist Sparkman, LLP

(57) ABSTRACT

Disclosed devices for injection of medicament to a subject can include a hand-held unit, at least one control unit, and one or more medicament chambers fluidly coupled to the control unit. The hand-held unit having a head portion and a body portion, the head portion comprising at least one needle and a movable head, the movable head being axially movable relative to the body portion between an extended position and a retracted position. The control unit being fluidly coupled to the hand-held unit and having a pump having a dosing chamber.

10 Claims, 30 Drawing Sheets

Related U.S. Application Data

(60) Provisional application No. 62/954,984, filed on Dec. 30, 2019, provisional application No. 62/872,547, filed on Jul. 10, 2019, provisional application No. 62/829,357, filed on Apr. 4, 2019.

(51) Int. Cl.
*A61M 5/145* (2006.01)
*A61M 5/158* (2006.01)
*A61M 5/168* (2006.01)

(52) U.S. Cl.
CPC ...... *A61M 5/1413* (2013.01); *A61M 5/14526* (2013.01); *A61M 5/158* (2013.01); *A61M 5/16813* (2013.01); *A61M 2205/13* (2013.01); *A61M 2250/00* (2013.01)

(58) Field of Classification Search
CPC .............. A61M 5/14526; A61M 5/158; A61M 5/16813; A61M 2205/13; A61M 2250/00; A61M 2005/31588; A61M 2205/36; A61M 2205/505; A61M 2205/8206; A61M 5/46; A61M 5/142; A61M 5/20; A61M 39/22; A61M 5/3202; A61M 5/321
See application file for complete search history.

(56) References Cited

U.S. PATENT DOCUMENTS

| | | | |
|---|---|---|---|
| 4,717,383 A | 1/1988 | Phillips et al. | |
| 4,985,015 A | 1/1991 | Obermann | |
| 5,320,162 A | 6/1994 | Seaman | |
| 5,807,336 A | 9/1998 | Russo | |
| 6,858,020 B2 | 2/2005 | Rusnak | |
| 7,056,307 B2 | 6/2006 | Smith et al. | |
| 8,029,469 B2 | 10/2011 | Ethelfield | |
| 8,529,522 B2 | 9/2013 | Cohen | |
| 9,706,754 B2 | 7/2017 | Prescott et al. | |
| 10,258,445 B2 | 4/2019 | Halamish et al. | |
| 2001/0008961 A1 | 7/2001 | Hecker | |
| 2002/0183616 A1 | 12/2002 | Toews et al. | |
| 2004/0134494 A1 | 7/2004 | Papania et al. | |
| 2005/0043681 A1* | 2/2005 | Rusnak .................. | A61D 1/025 604/151 |
| 2005/0209569 A1 | 9/2005 | Ishikawa et al. | |
| 2006/0135910 A1 | 6/2006 | Luther et al. | |
| 2008/0114305 A1 | 5/2008 | Gerondale | |
| 2008/0177223 A1 | 7/2008 | Johnston et al. | |
| 2009/0018505 A1 | 1/2009 | Arguedas et al. | |
| 2009/0163860 A1 | 6/2009 | Patrick | |
| 2009/0198215 A1 | 8/2009 | Chong et al. | |
| 2009/0270796 A1 | 10/2009 | Perry et al. | |
| 2010/0130960 A1 | 5/2010 | Spire | |
| 2012/0073515 A1 | 3/2012 | Chung et al. | |
| 2012/0123386 A1* | 5/2012 | Tsals .................. | A61M 5/3287 604/506 |
| 2014/0114258 A1 | 4/2014 | Day | |
| 2015/0128873 A1 | 5/2015 | Prescott et al. | |
| 2015/0174321 A1 | 6/2015 | Cohen | |
| 2016/0101240 A1 | 4/2016 | Samson | |
| 2016/0235512 A1 | 8/2016 | Miller et al. | |
| 2016/0263321 A1 | 9/2016 | Eisele et al. | |
| 2016/0296313 A1 | 10/2016 | Buckley et al. | |
| 2016/0324613 A1 | 11/2016 | Halamish et al. | |
| 2017/0197037 A1 | 7/2017 | Edwards | |
| 2019/0183622 A1 | 6/2019 | Halamish et al. | |

FOREIGN PATENT DOCUMENTS

| | | |
|---|---|---|
| CA | 2959162 | 3/2016 |
| CN | 1791440 A | 6/2006 |
| CN | 102105183 A | 6/2011 |
| CN | 203208448 U | 9/2013 |
| CN | 103458940 A | 12/2013 |
| CN | 104812334 A | 7/2015 |
| CN | 105597185 A | 5/2016 |
| CN | 105682607 A | 6/2016 |
| CN | 106029004 A | 10/2016 |
| CN | 106421978 A | 2/2017 |
| CN | 107468372 | 12/2017 |
| CN | 106029004 B | 3/2018 |
| EP | 0747083 A2 | 12/1996 |
| EP | 2285436 | 10/2015 |
| EP | 3089703 A1 | 11/2016 |
| GB | 2233234 | 1/1991 |
| WO | WO 2003082381 A1 | 10/2003 |
| WO | WO 2004/101060 | 11/2004 |
| WO | WO 2008/057223 | 5/2008 |
| WO | WO 2008/079824 | 7/2008 |
| WO | WO2009062508 A1 | 5/2009 |
| WO | WO 2009/134577 | 11/2009 |
| WO | WO 2010/052579 | 5/2010 |
| WO | WO 2012/176029 | 12/2012 |
| WO | WO 2013/064475 | 5/2013 |
| WO | WO 2014/016807 | 3/2014 |
| WO | WO 2014/107766 | 7/2014 |
| WO | WO 2015/101981 | 7/2015 |
| WO | WO 2017/086807 | 5/2017 |
| WO | WO 2017/086924 | 5/2017 |
| WO | WO 2018/092138 | 5/2018 |
| WO | WO 2018/203203 | 11/2018 |
| WO | WO2020002321 A1 | 1/2020 |

OTHER PUBLICATIONS

Office action for U.S. Appl. No. 16/667,405, issued Jan. 6, 2022 (19 pages).
Office action for Indian Application No. 201917048613, issued Feb. 17, 2022 (includes translation) (5 pages).
Office action for Chinese Application No. 201880079657.8, issued on Jul. 13, 2022 with Eng. Translation (24 pages).
Extended European Search Report, issued Dec. 2, 2022 in European Patent Application No. EPC 20784040.6, filed Apr. 3, 2020 (10 pages).
International Search Report and Written Opinion for PCT/IB2021/057450, dated Nov. 5, 2021 (14 pages).
Office action for Chinese Application No. 201880029105.6, issued Apr. 13, 2022 (with English translation) (25 pages).
Office Action for Russian Application No. 2020121737 issued on Apr. 26, 2022 (with English translation) (17 pgs).
Third Office Action for Chinese Application No. 201880029105.6 issued on May 18, 2022 (with English translation) (24 pgs).
Office action for Indian Application No. 202017024196 issued on Jun. 15, 2022 (with English translation) (7 pages).
Office Action for Israeli Application No. 246538, issued Dec. 12, 2019 (4 pages, translation incorporated into Office Action).
Office Action for Mexican Application No. MX/a/2016/008647, issued Jul. 19, 2019 (3 pages) (4 pages of translation).
Office Action for Mexican Application No. MX/a/2016/008647, issued Nov. 7, 2019 (4 pages) (5 pages of translation).
International Search Report & Written Opinion, PCT/IB2018/059883, mailed Mar. 25, 2019 (11 pages).
International Search Report & Written Opinion, PCT/IB2018/052958, mailed Aug. 12, 2018 (14 pages).
European Search Report, EP 14876301.4, dated Aug. 3, 2017 (3 pages).
Office action for European Application No. EPC 14876301.4 issued Mar. 10, 2020 (5 pages).
Office action for Brazil Application No. BR112016015342, issued May 13, 2020 (3 pages).
International Search Report & Written Opinion, PCT/IB2020/053177, dated Jul. 19, 2020 (20 pages).
Extended European Search Report, issued Sep. 1, 2020, European Patent Application No. EPC 18794760.1, filed Apr. 28, 2018 (10 pages).
Office Action for Israeli Application No. 246538, issued Jan. 21, 2021 (6 pages, Office Action and translation).

(56) References Cited

OTHER PUBLICATIONS

Office Action for Chinese Application No. 201880029105.6, issued Jun. 2, 2021 (24 pages, with English translation).
Office action for U.S. Appl. No. 16/285,865, issued Aug. 5, 2021 (7 pages).
Examination Report for European Application No. EP 18794760.1, issued by the European Patent Office on Aug. 6, 2021 (8 pages).
Examination Report for Russian Application No. 2019136958, issued by the Russian Patent Office on Aug. 18, 2021 (21 pages with Eng translation).
Examination Report for European Application No. EP 18888570.1, issued by the European Patent Office on Oct. 21, 2021 (13 pages).
Office action for Chinese Application No. 201880079657.8, issued Oct. 27, 2021 (7 pages).

* cited by examiner

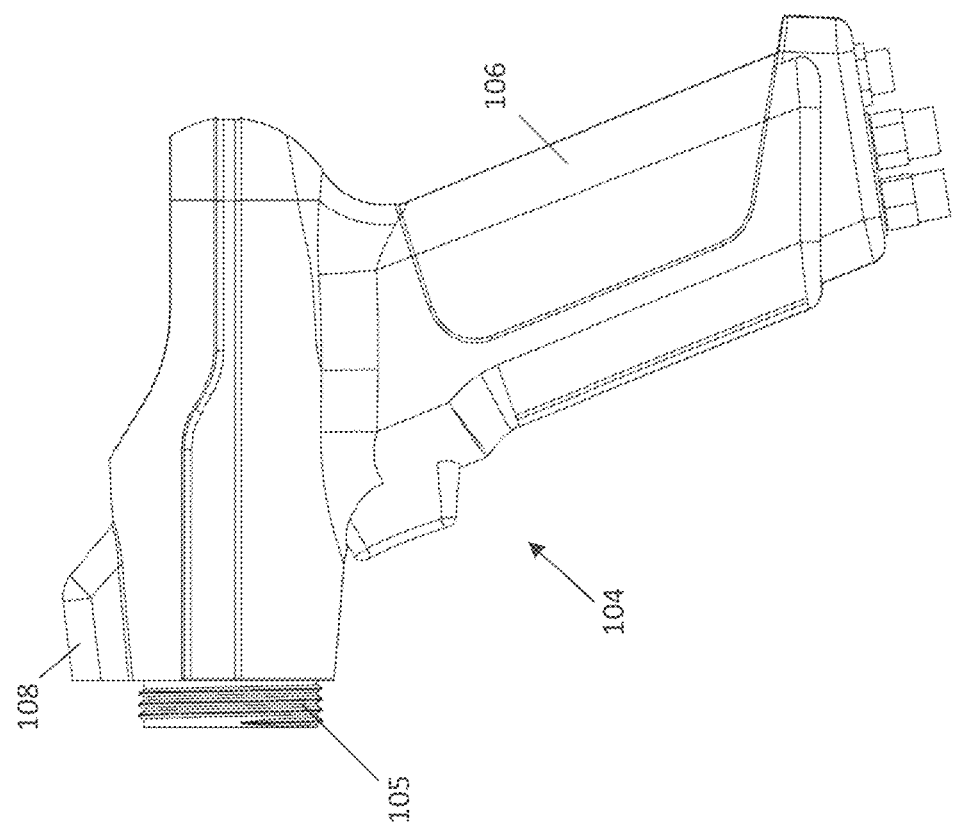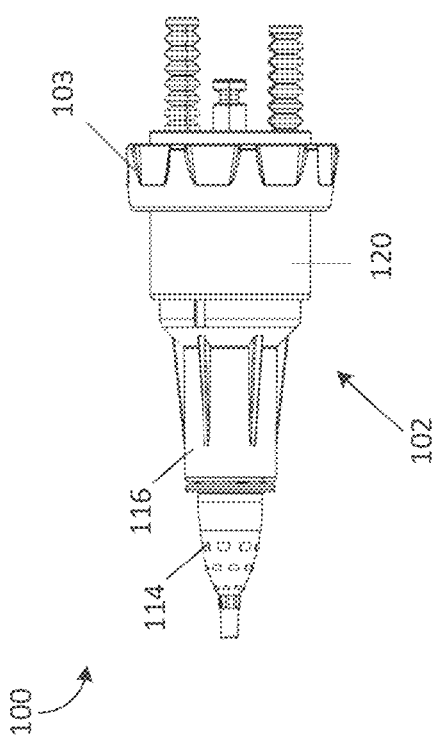
FIG. 2

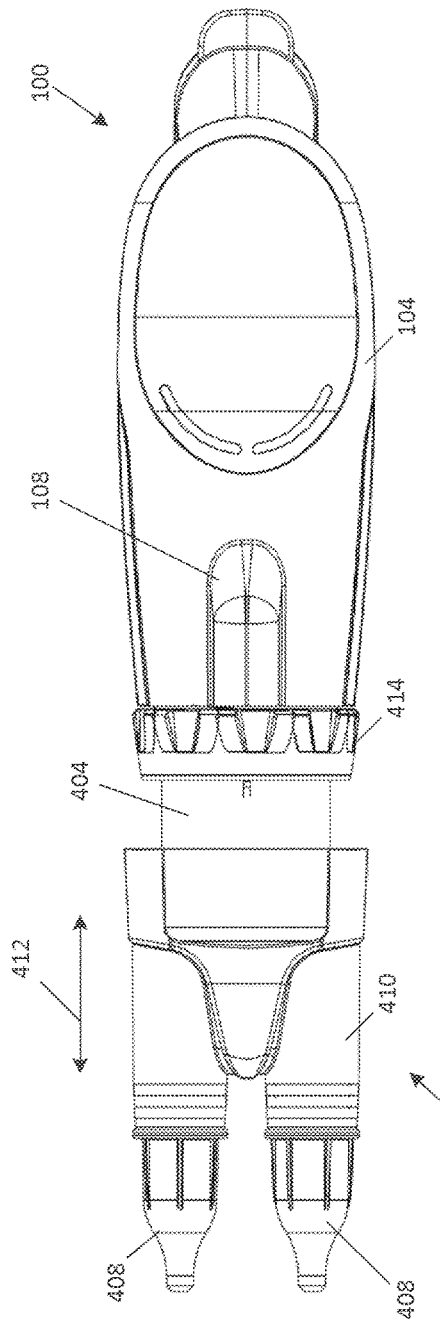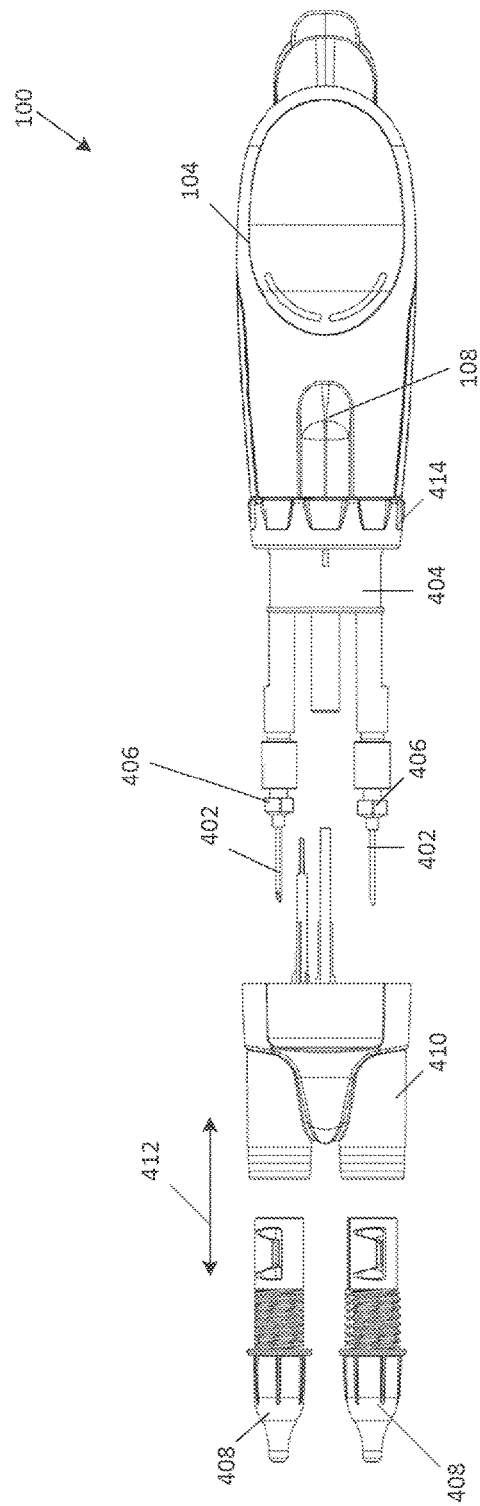

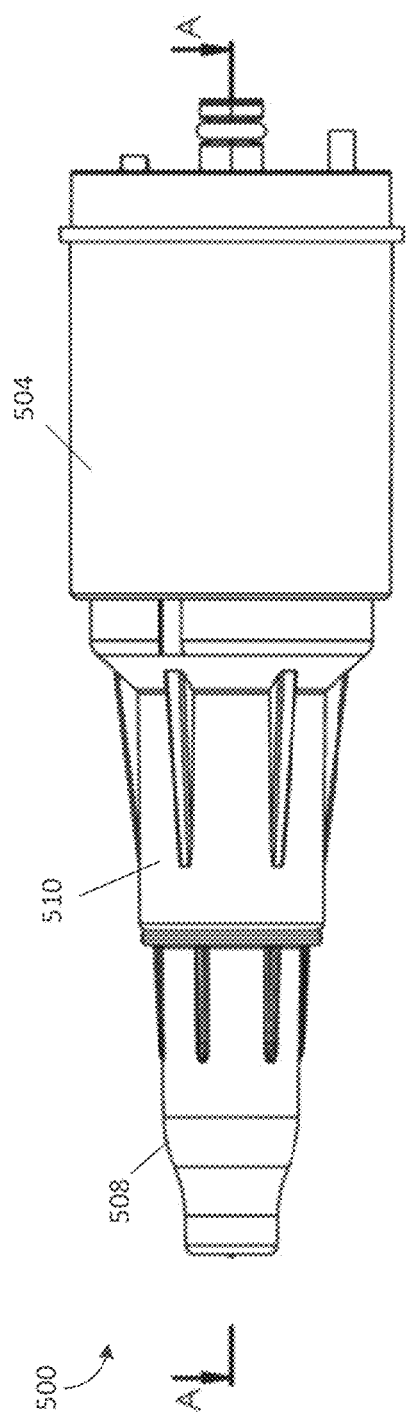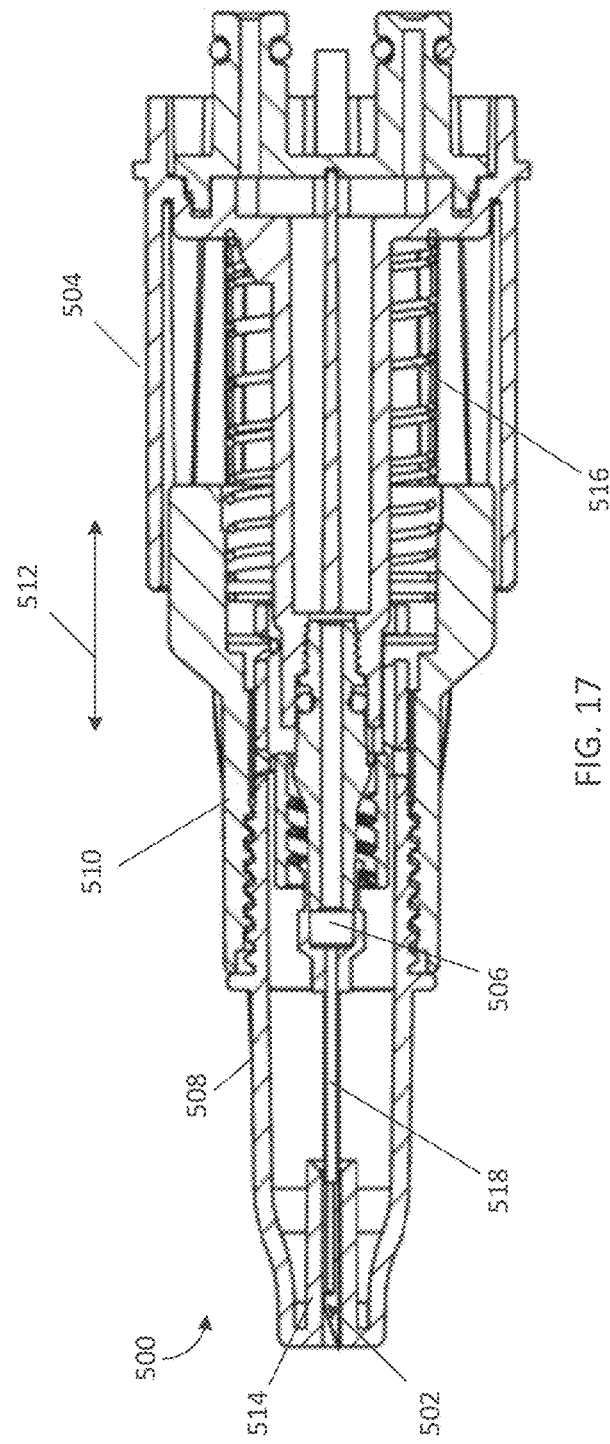

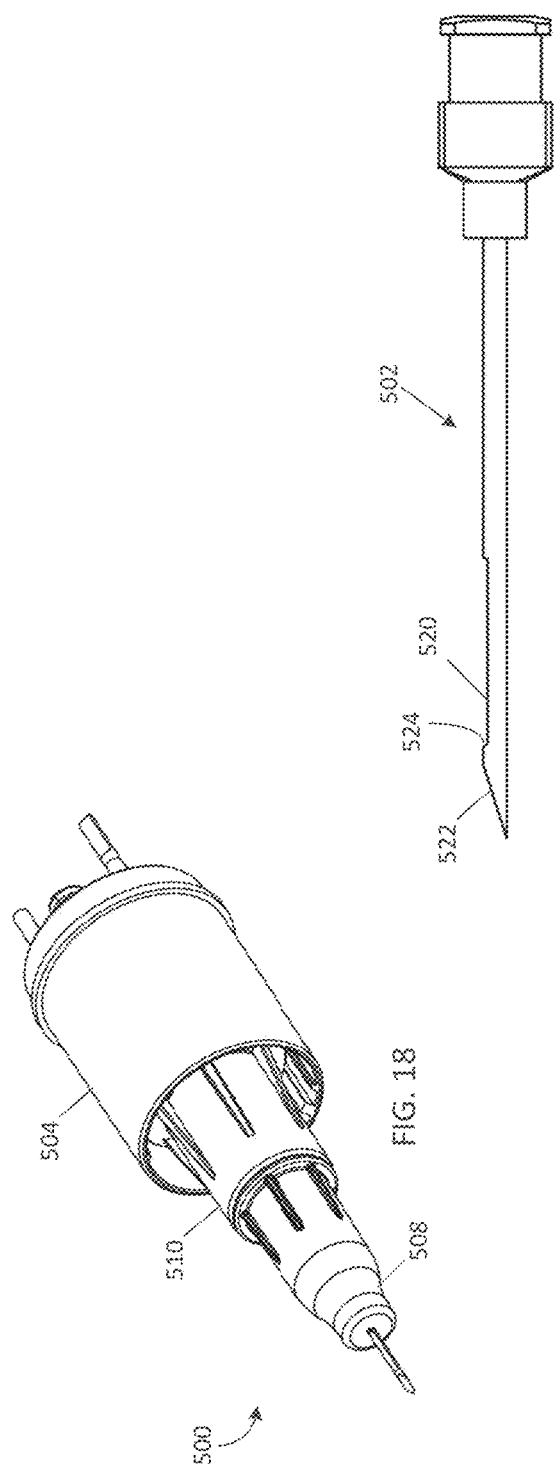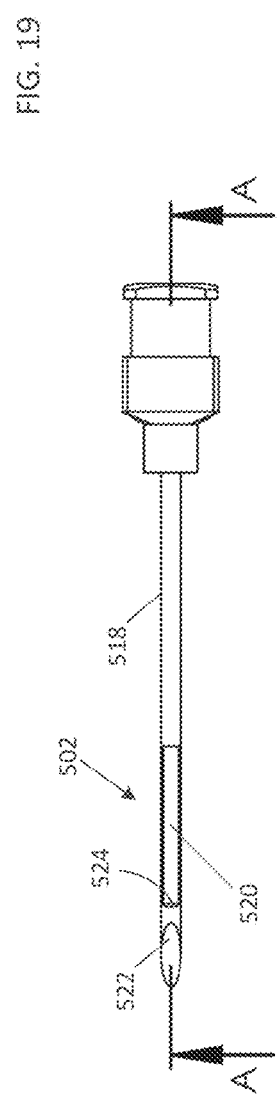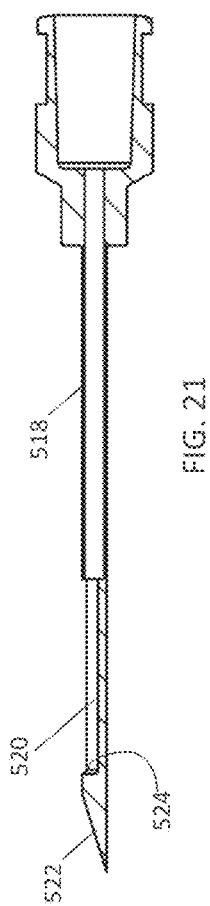

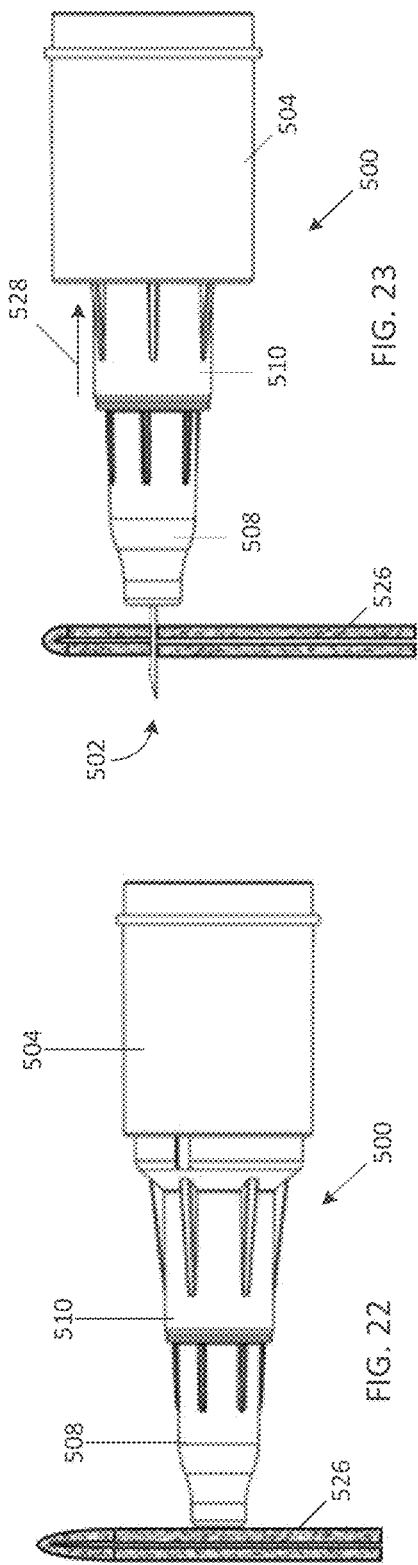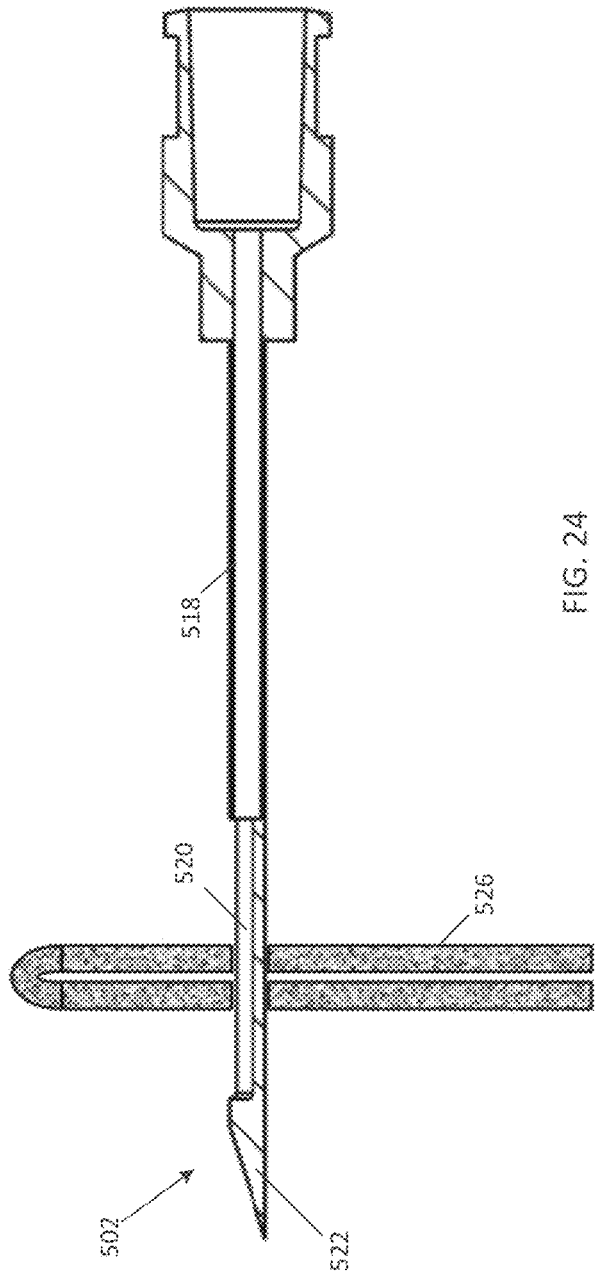

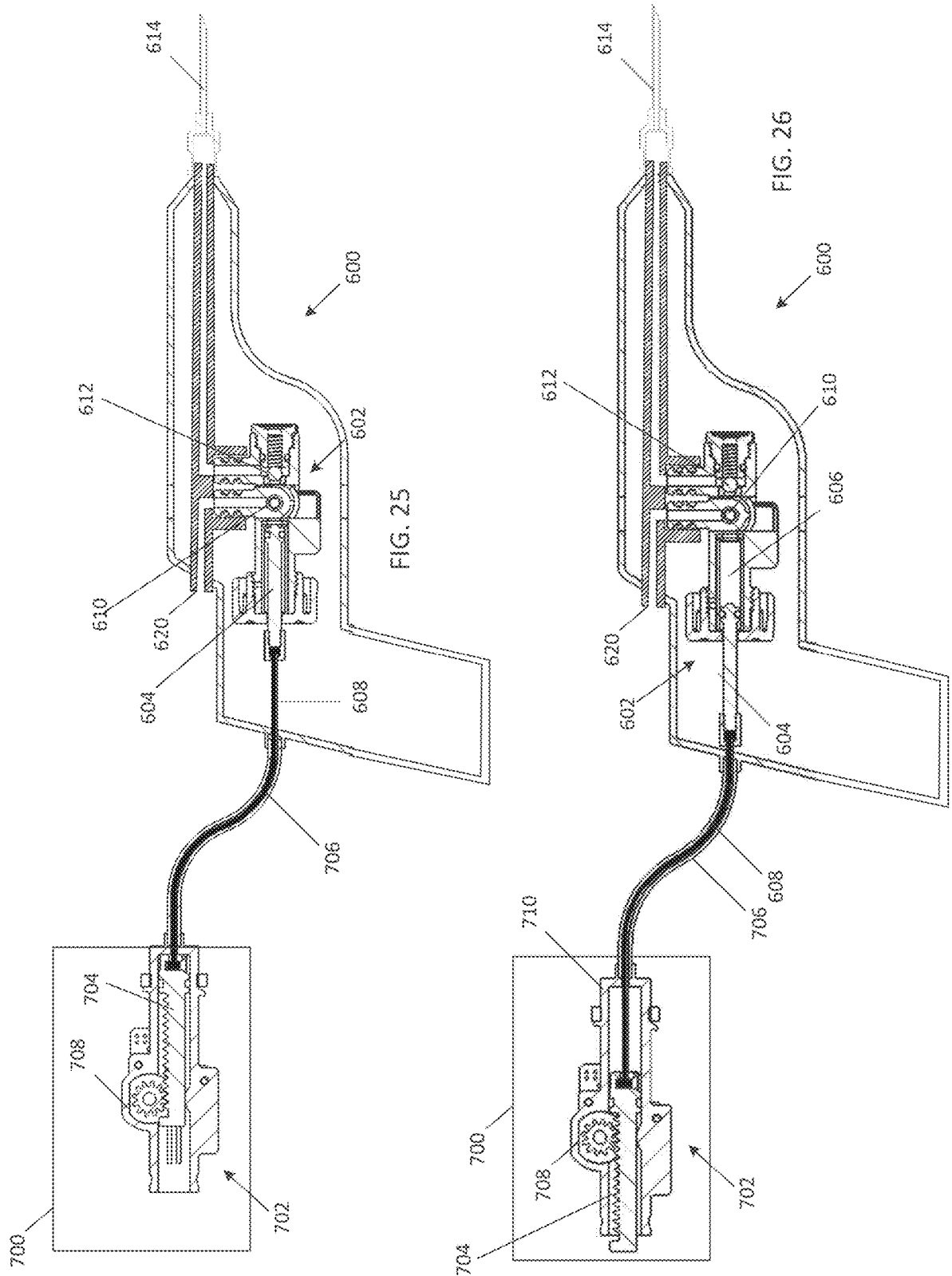

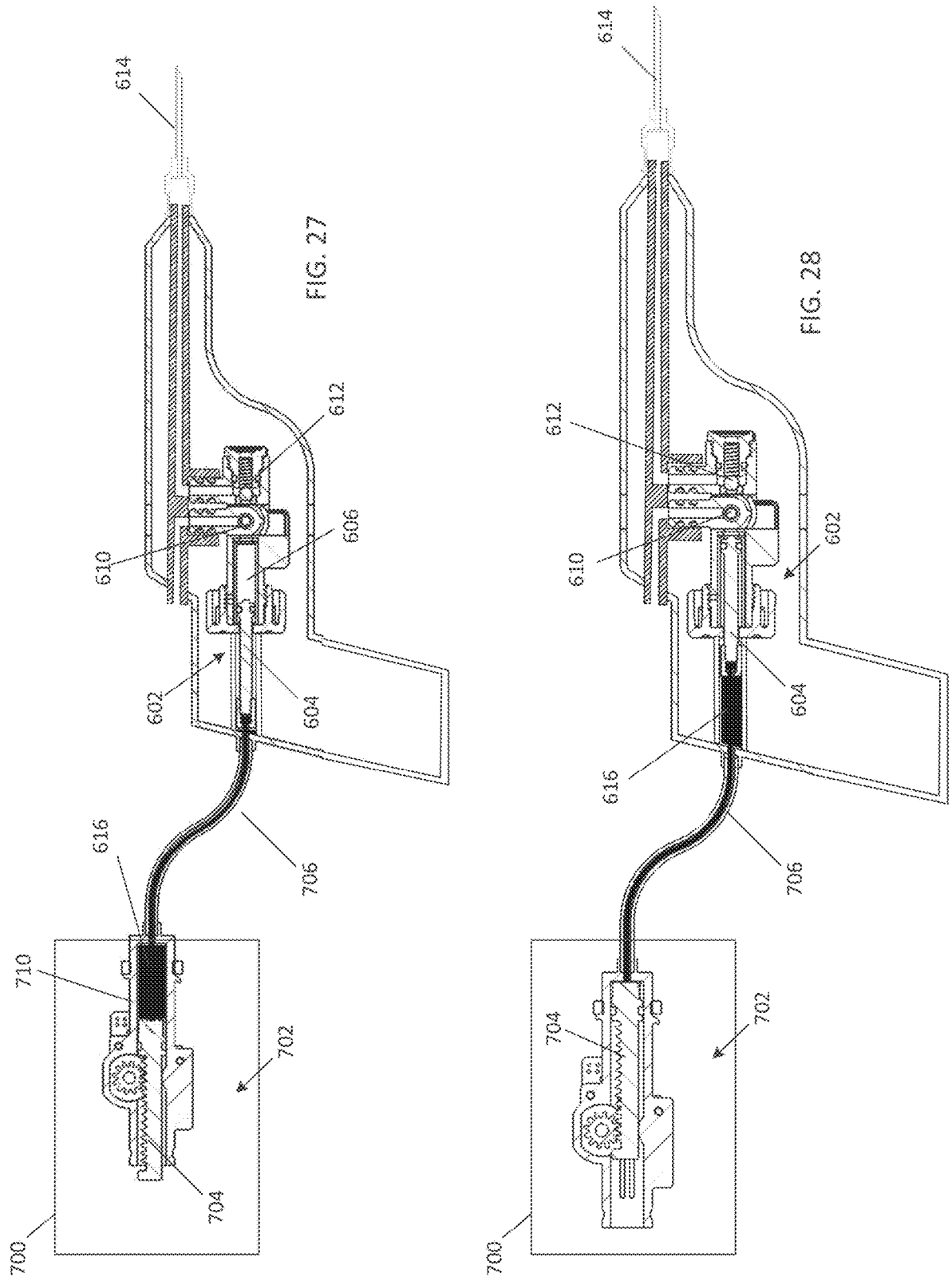

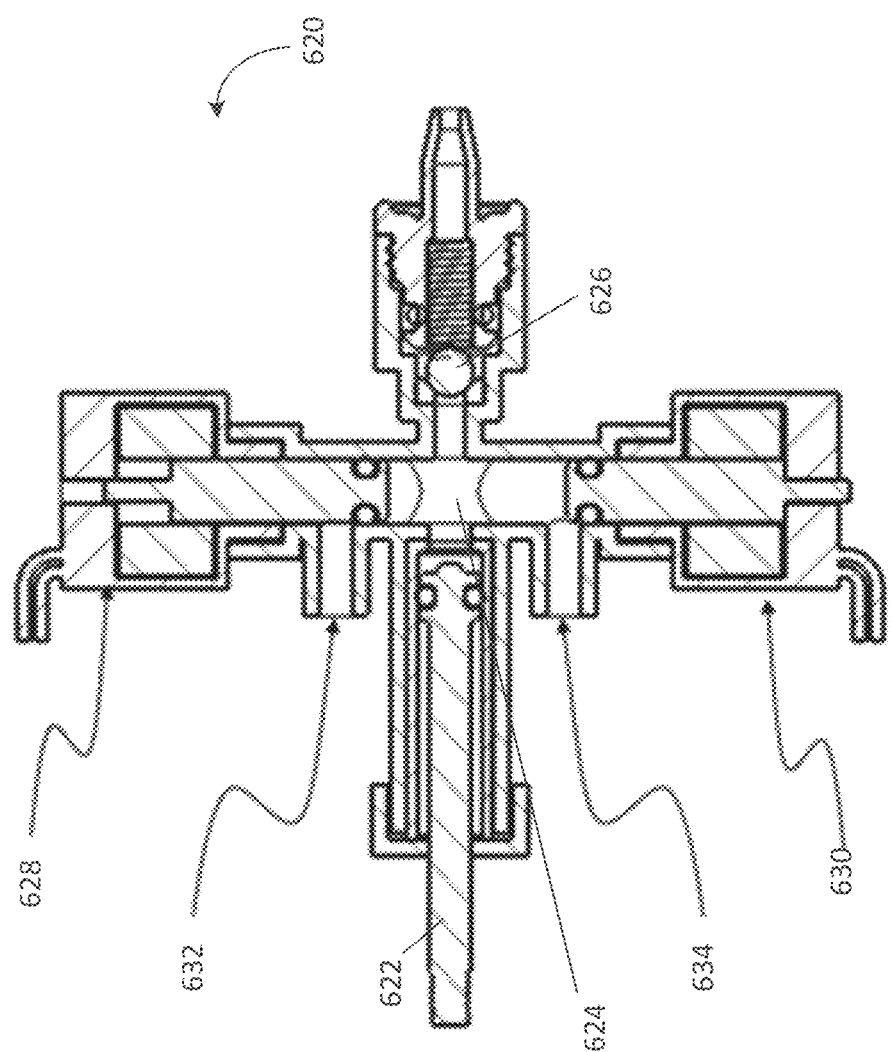

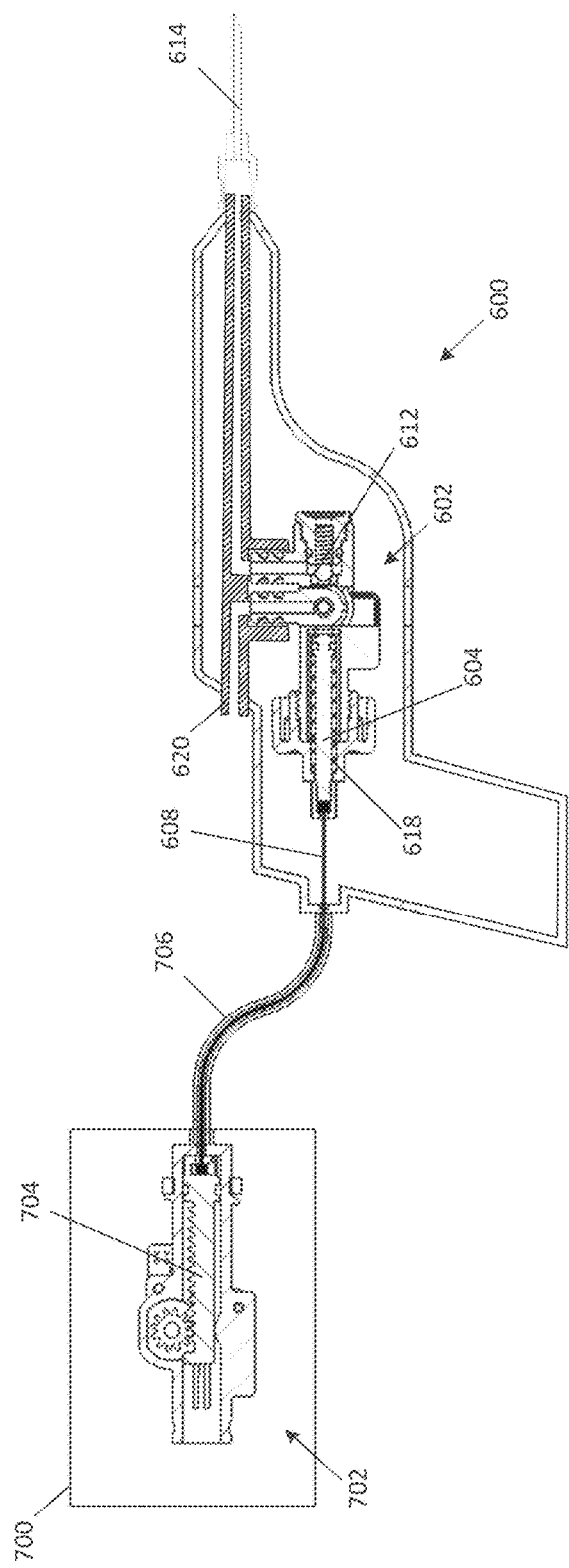
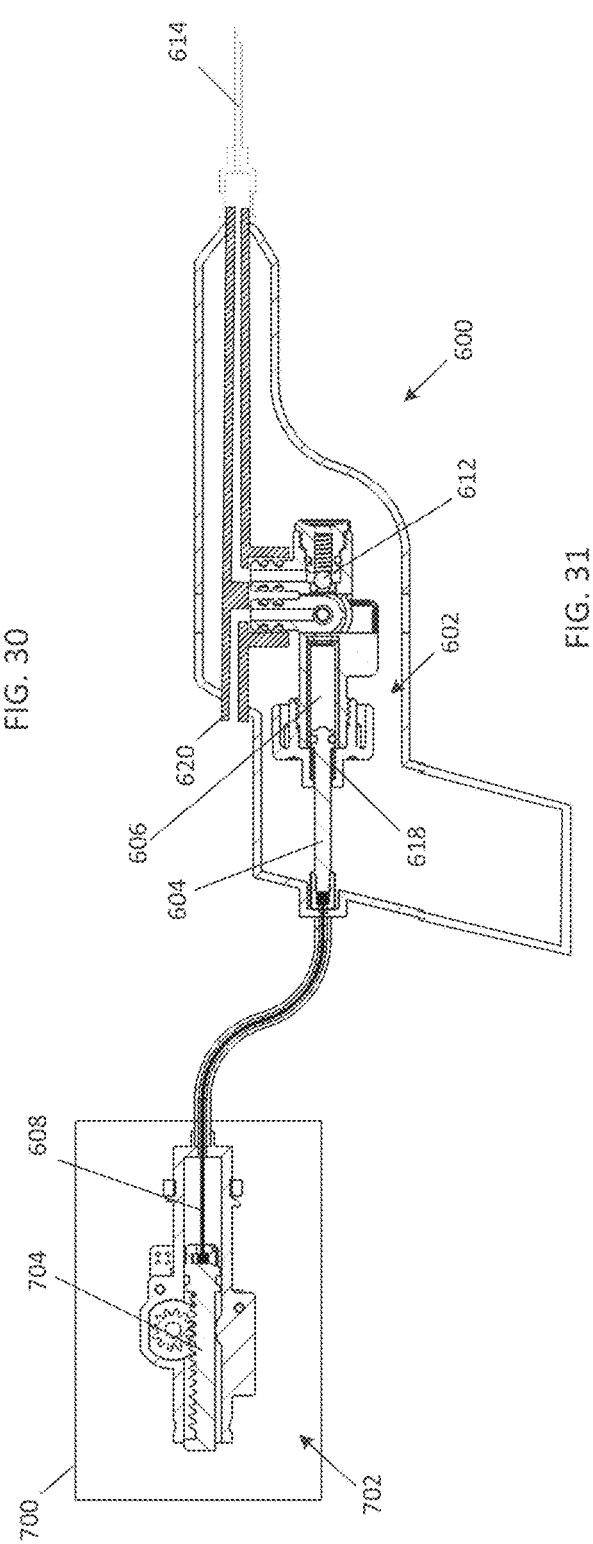

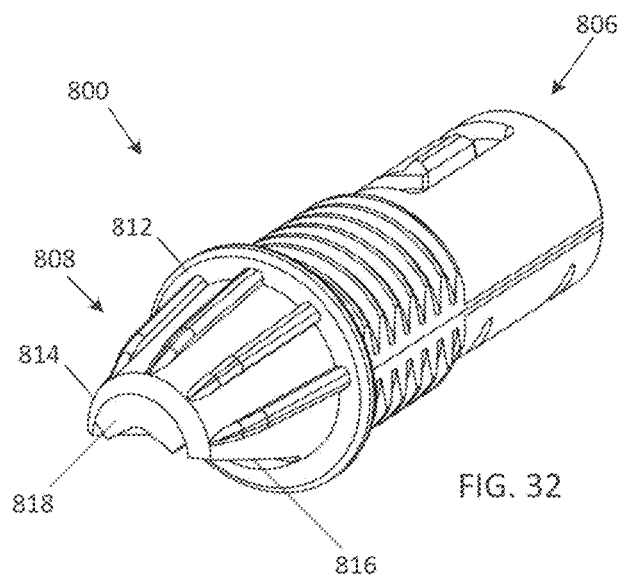
FIG. 32
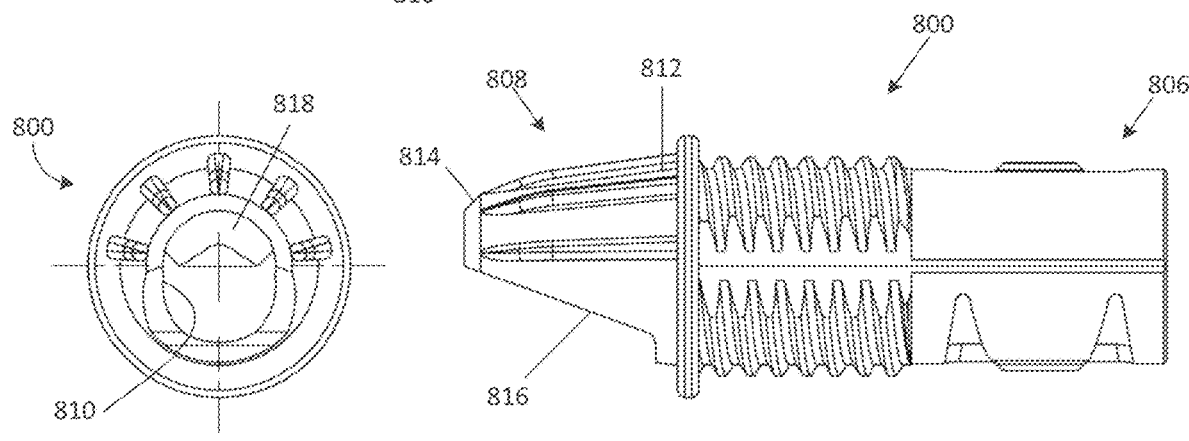
FIG. 33
FIG. 34

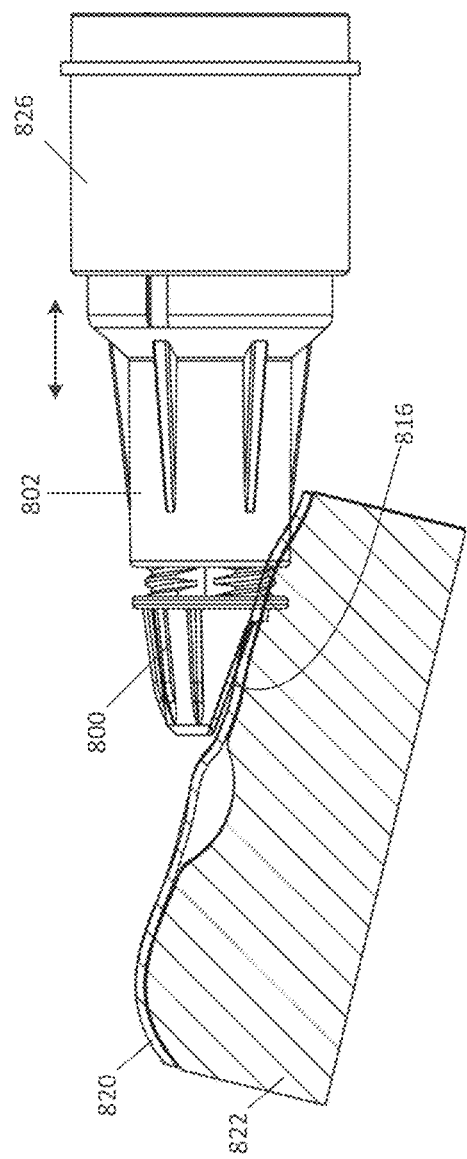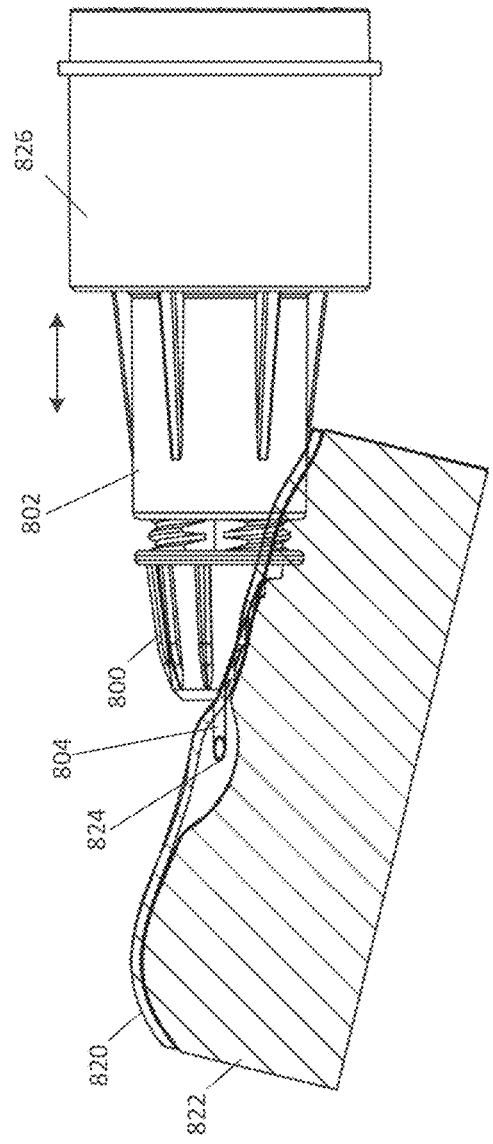

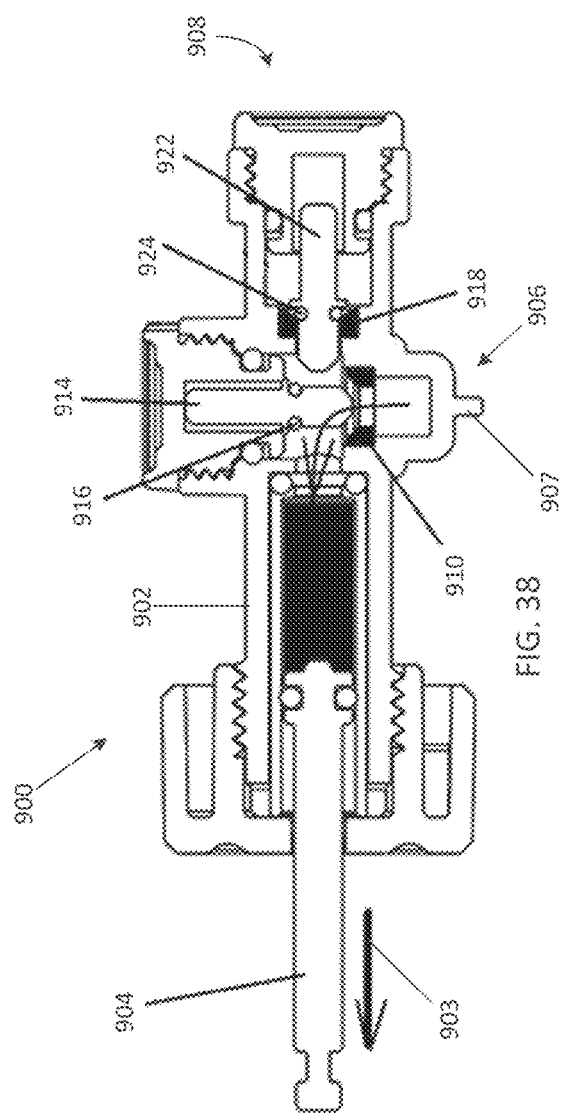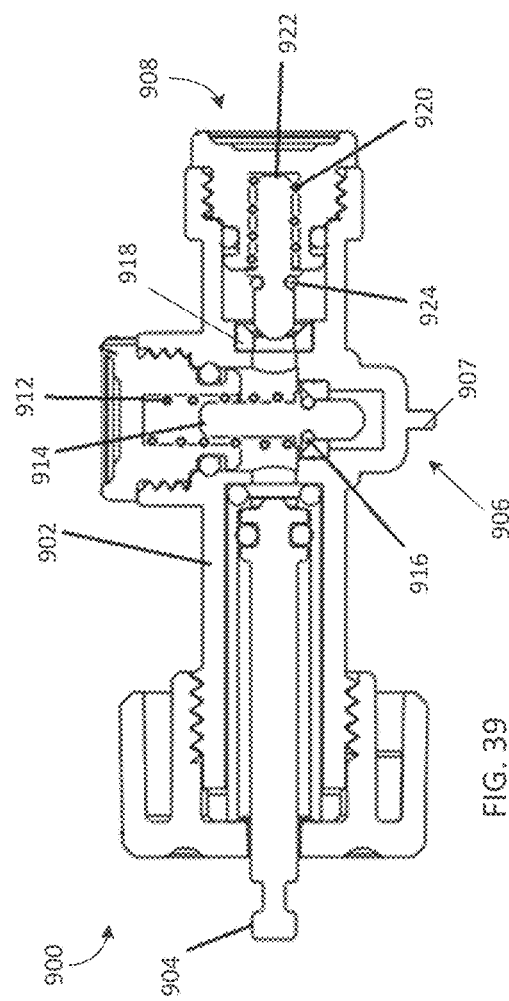

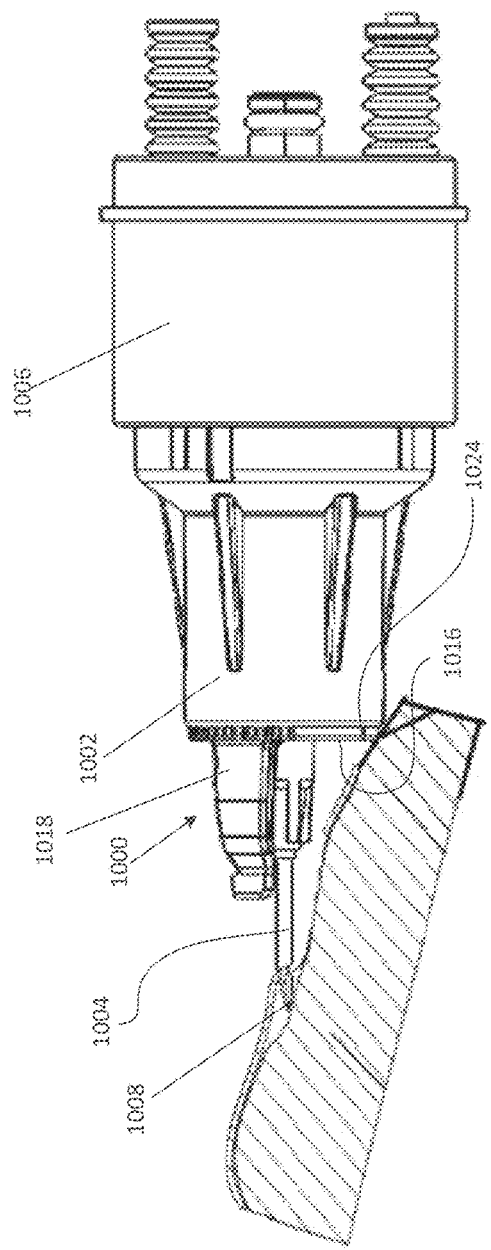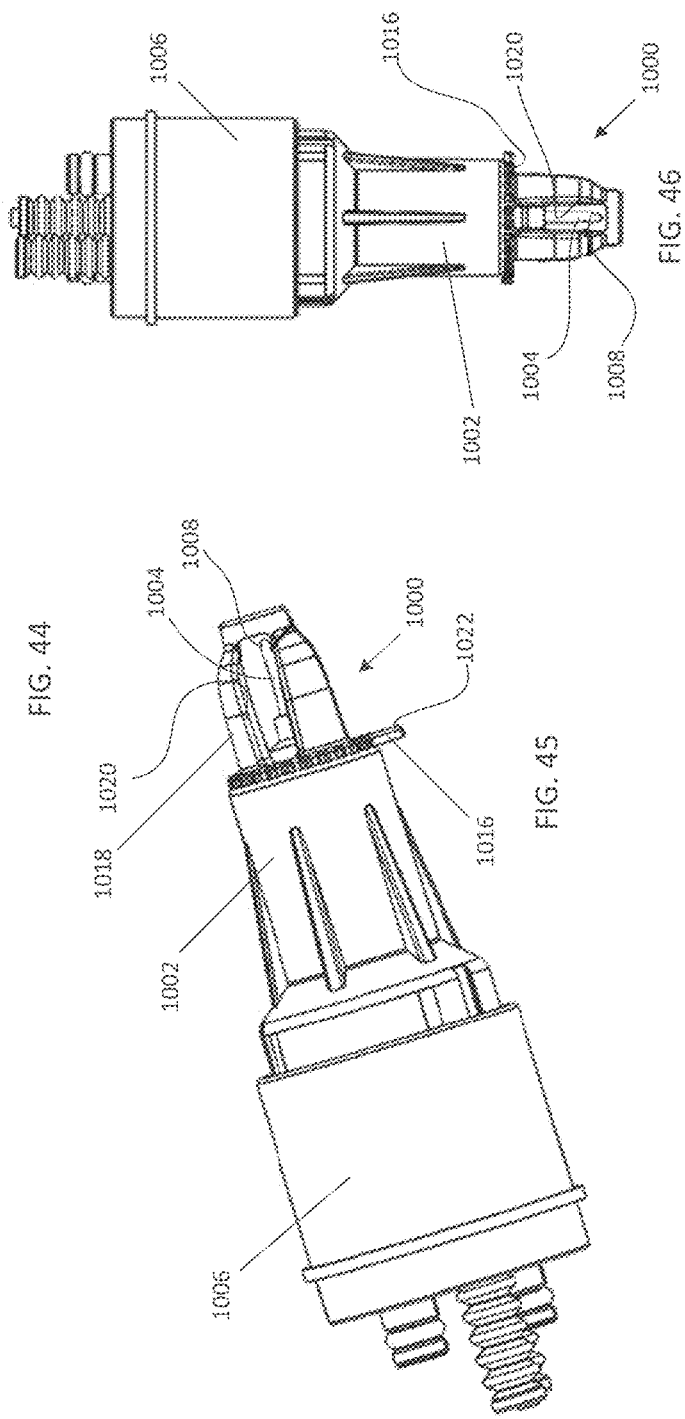

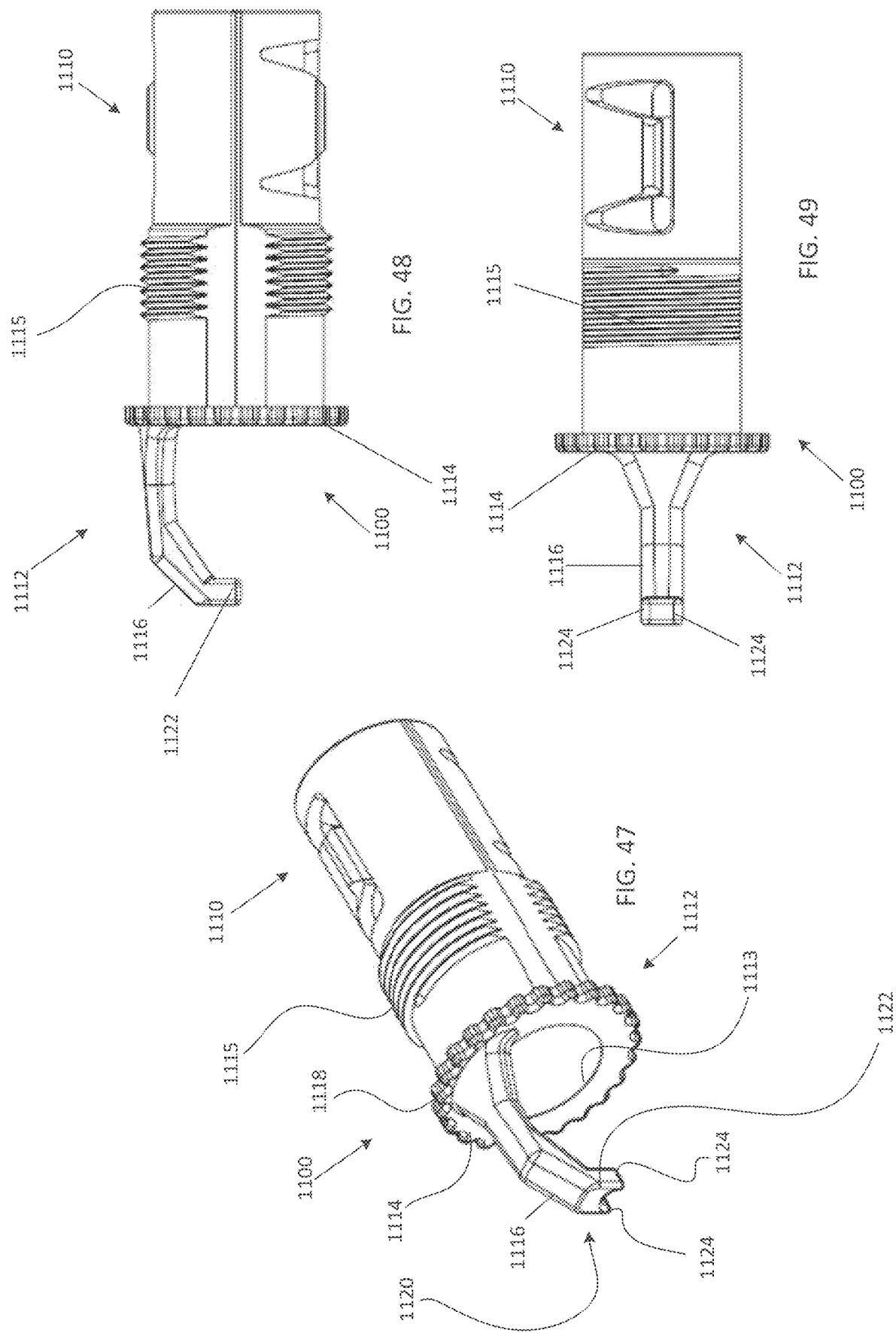

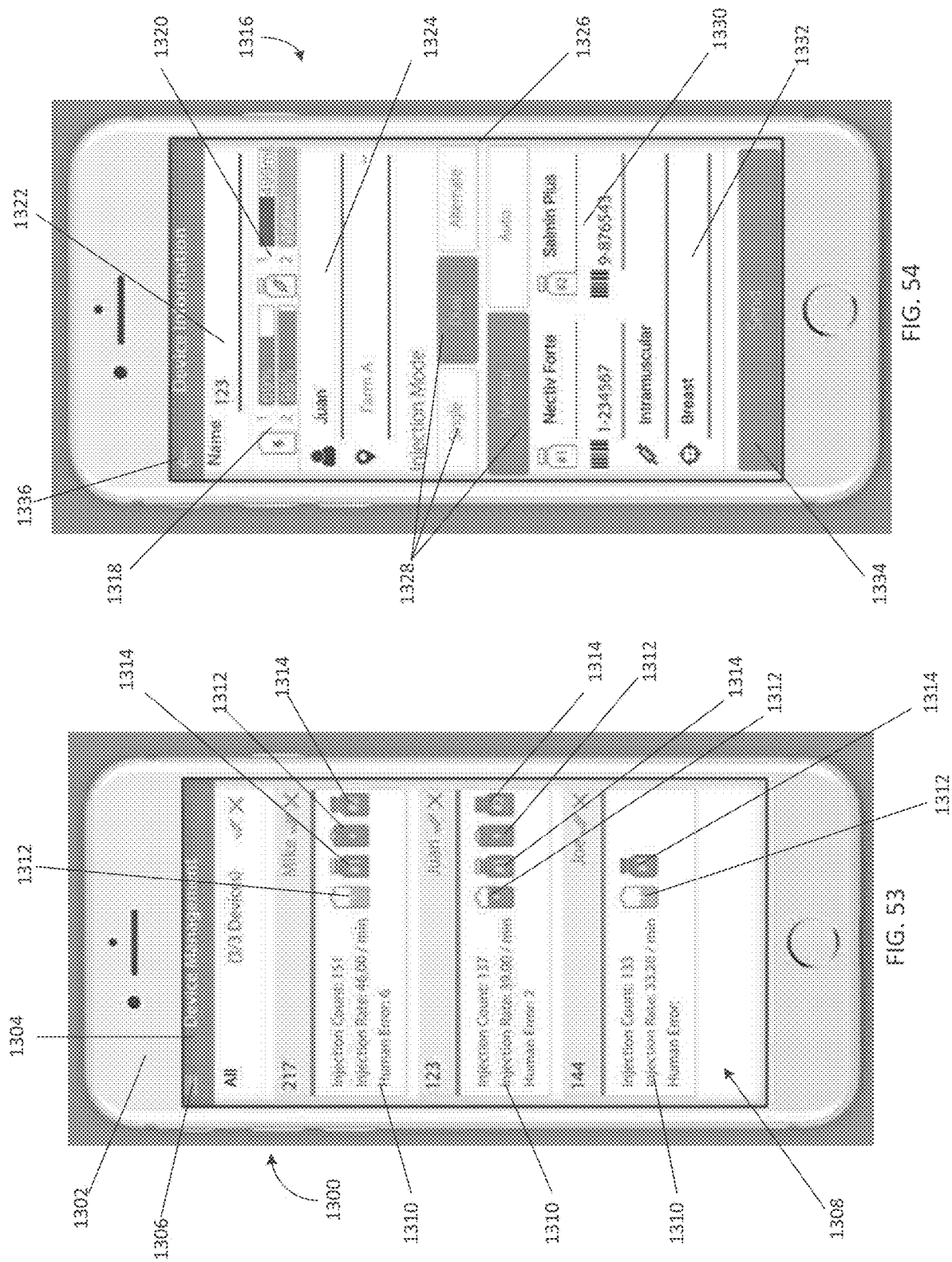

INJECTION APPARATUS AND METHOD FOR USE

CROSS REFERENCE TO RELATED APPLICATION

The present application is a continuation of International Application No. PCT/IB2020/053177, filed on Apr. 3, 2020, which claims the benefit of U.S. Provisional Application No. 62/954,984, filed on Dec. 30, 2019, U.S. Provisional Application No. 62/872,547, filed on Jul. 10, 2019, and U.S. Provisional Application No. 62/829,357, filed on Apr. 4, 2019. Each of these prior applications is incorporated by reference herein in its entirety.

FIELD

The present disclosure concerns injection apparatuses for injecting subjects, particularly livestock animals, and more particularly concerns automated injection apparatuses for injecting a large number of feed or companion animals (e.g., poultry, swine, cattle, sheep, goats, ungulates, cats, dogs, and/or aquatic species including fish) with one or more medicaments.

BACKGROUND

In the livestock industry, animals often must be administered substances such as medications, for a variety of reasons. Typically, each producer must treat large numbers of animals. Treatment can often require injecting each animal with a plurality of medications, generally in liquid form. Such medications can include medicines, vaccines, hormones, food supplements and the like (hereinafter referred to generally as "medicament"). Administering such medicaments typically includes using an administration device, such as a syringe or drenching unit, from which a medicament dose is either manually or automatically administered to the animal. This type of administration typically includes hand actuation or pumping of the medication device to deliver the medication to the animal.

Treating a large number of animals (e.g., via a hand actuated device) causes operator fatigue. This can result in a number of malfunctions, for example: (i) accidental self-injection by the operator; (ii) administering the medicament dose when the needle has not yet penetrated the subject's skin or has not yet penetrated to the desired depth; (iii) administering the dose after the needle has been removed from the subject; (iv) administering only a portion of the required dose; (v) inserting the needle into the subject in a non-optimal orientation; and/or (vi) administering a duplicate dose to the same individual, among others.

Additionally, in many cases it is necessary to administer more than one medicament to a single animal. In cases where there is no ready composition of the different medicaments, or where it is not possible to combine two or more medicaments together, more than one injection must be performed per subject, contributing to operator fatigue.

Accordingly, there is a continuing need for improved injector devices and methods for their use, such as devices for injecting a large number of animals with one or more medicaments.

SUMMARY

Described herein are embodiments of an injection apparatus for administering one or more medicaments to a subject (e.g., poultry, swine, cattle, sheep, goats, ungulates, cats, dogs, and/or aquatic species including fish). The injection apparatus can be used to administer medicament to a large number of subjects in a quick and efficient manner to prevent and/or reduce operator error, operator fatigue, and injection malfunction.

In a representative embodiment, an injection apparatus can comprise a hand-held unit having a head portion that comprises at least one needle, and at least one control unit remote from the hand-held unit and fluidly coupled to the hand-held unit via one or more connecting tubes. The at least one control unit typically comprises a pump having a piston.

In some embodiments, the head portion (including the needle) can be removably coupled to a body portion of the hand-held unit. In some embodiments, the head portion comprises a connector having a threaded receiving portion configured to engage a correspondingly threaded portion of the body portion. In some embodiments, the head portion comprises a movable head that is axially movable relative to a body portion of the hand-held unit between an extended configuration and a retracted configuration. When the movable head is in the retracted configuration a distal point portion of the needle is exposed.

In some embodiments, the control unit is configured to be worn by a user. In some embodiments, the pump can be removably coupled to the control unit and can comprise at least one, typically two or more non-return valves, to allow fluid to flow in a first direction and not in a second direction. For example, the non-return valves can allow fluid to flow from the one or more containers to the one or more control units and prevent fluid from flowing from the control units to the containers.

In some embodiments, the injection apparatus further comprises one or more medicament containers fluidly coupled to the control unit.

In some embodiments, the at least one needle is a first needle and the head portion comprises a second needle. In some embodiments, the at least one control unit is a first control unit, and the injection apparatus comprises a second control unit. In such embodiments, the first needle can be fluidly coupled to the first control unit and the second needle can be fluidly coupled to the second control unit.

An injection apparatus may comprise a control panel configured to allow an operator to input medicament dose volumes for one or more medicaments. The control panel may be located on the at least one control unit the control panel may display information relating to an injection process.

Medicament can be administered automatically upon insertion of the at least one needle to a selected depth within the subject.

The injection apparatus can further comprise a protrusion extending from the head portion rearwardly toward the body portion and a sensor coupled to the body portion. When a selected length of the at least one needle is exposed from the movable head, the protrusion can engage the sensor. When engaged, the sensor is configured to inject a medicament.

The injection apparatus can further comprise a second pump having a second piston, the second pump located at the hand-held unit. The first piston can be operatively coupled to the second piston such that movement of the first piston causes corresponding movement of the second piston. The first piston can be coupled to the second piston via an actuator. In some embodiments, the actuator can be a wire. In other embodiments, the actuator can be hydraulic fluid contained within a connecting tube. The injection apparatus can further comprise one or more medicament containers fluidly coupled to a dosing chamber of the second pump.

The movable head portion can further comprise a collection sleeve configured to collect medicament within the movable head, and wherein the needle comprises a groove configured to hold a selected dose of medicament.

A pump for an injection apparatus can comprise a dosing chamber into which a piston extends, a first valve, and a second valve. The piston can be movable relative to the dosing chamber between a first position and a second position. The first valve can have a first opening and can comprise a first biasing member and a first stopper, the first biasing member being movable between a biased position wherein the first stopper occludes the first opening and an open position wherein the first stopper does not occlude the first opening. The second valve can have a second opening and can comprise a second biasing member and a second stopper, the second biasing member being movable between a biased position wherein the second stopper occludes the second opening and an open position wherein the second stopper does not occlude the second opening. The piston can be configured to create a reduced pressure within the dosing chamber when the piston moves from the first position to the second position, the reduced pressure being sufficient to move the first biasing member from the biased position to the open position, and the piston can be configured to create a positive pressure within the dosing chamber when the piston moves from the second position to the first position, the positive pressure being sufficient to move the second biasing member from the biased position to the open position.

The foregoing and other objects, features, and advantages of the invention will become more apparent from the following detailed description, which proceeds with reference to the accompanying figures.

BRIEF DESCRIPTION OF THE DRAWINGS

FIG. 2 is a side view of a hand-held unit of an exemplary injection apparatus with the head portion removed.

FIG. 14 is a top plan view of an exemplary hand-held unit.

FIG. 15 is a top plan view of the hand-held unit of FIG. 14 with the head portion shown in an exploded configuration.

FIG. 16 is a top plan view of a head portion of an exemplary hand-held unit.

FIG. 17 is a cross-sectional view of the head portion of FIG. 16 along line A-A.

FIG. 18 is a perspective view of the head portion of FIG. 16 with the movable head in a retracted configuration.

FIG. 19 is a side elevational view of an exemplary needle.

FIG. 20 is a top plan view of an exemplary needle including an extension portion.

FIG. 21 is a partial cross-sectional view of the needle of FIG. 20 shown along line A-A.

FIG. 22 is a side elevational view of an exemplary head portion being used to administer medicament to a subject.

FIG. 23 is a side elevational view of the head portion of FIG. 23 being used to administer medicament to a subject.

FIG. 24 is a side elevational view of the head portion of FIG. 23 being used to administer medicament to a subject.

FIG. 25 is a cross-sectional side view of an exemplary hand-held unit coupled to an exemplary control unit.

FIG. 26 is a cross-sectional side view of the hand-held unit and control unit of FIG. 25.

FIG. 27 is a cross-sectional view of an exemplary hand-held unit coupled to an exemplary control unit.

FIG. 28 is a cross-sectional side view of the hand-held unit and control unit of FIG. 27.

FIG. 29 is a cross-sectional top plan view of an exemplary pump.

FIG. 30 is a cross-sectional side view of an exemplary hand-held unit coupled to an exemplary control unit.

FIG. 31 is a cross-sectional side view of the hand-held unit and control unit of FIG. 30.

FIG. 32 is a perspective view of one disclosed embodiment of an exemplary safety cover.

FIG. 33 is an end view of one disclosed embodiment of an exemplary safety cover.

FIG. 34 is a side view of one disclosed embodiment of an exemplary safety cover.

FIG. 35 is a side view of an exemplary head portion for an injection apparatus.

FIG. 36 is a side view of the head portion of FIG. 35 being used in a subcutaneous injection.

FIG. 38 is a cross-sectional side view of the pump of FIG. 37.

FIG. 39 is another cross-sectional side view of the pump of FIG. 37.

FIG. 44 is a side elevation view of a head portion comprising the safety cover of FIG. 40 being used in a subcutaneous injection.

FIG. 45 is a perspective view of a head portion comprising the safety cover of FIG. 40.

FIG. 46 is a top plan view of a head portion comprising the safety cover of FIG. 40.

FIG. 47 is a perspective view of an exemplary embodiment of a safety cover.

FIG. 48 is a side elevation view of the safety cover of FIG. 47.

FIG. 49 is a bottom plan view of the safety cover of FIG. 47.

FIG. 53 is an embodiment of a graphical user interface that includes a device management display pane.

FIG. 54 is an embodiment of a graphical user interface that includes a device sub-pane.

DETAILED DESCRIPTION

I. Definitions

Figure 1:
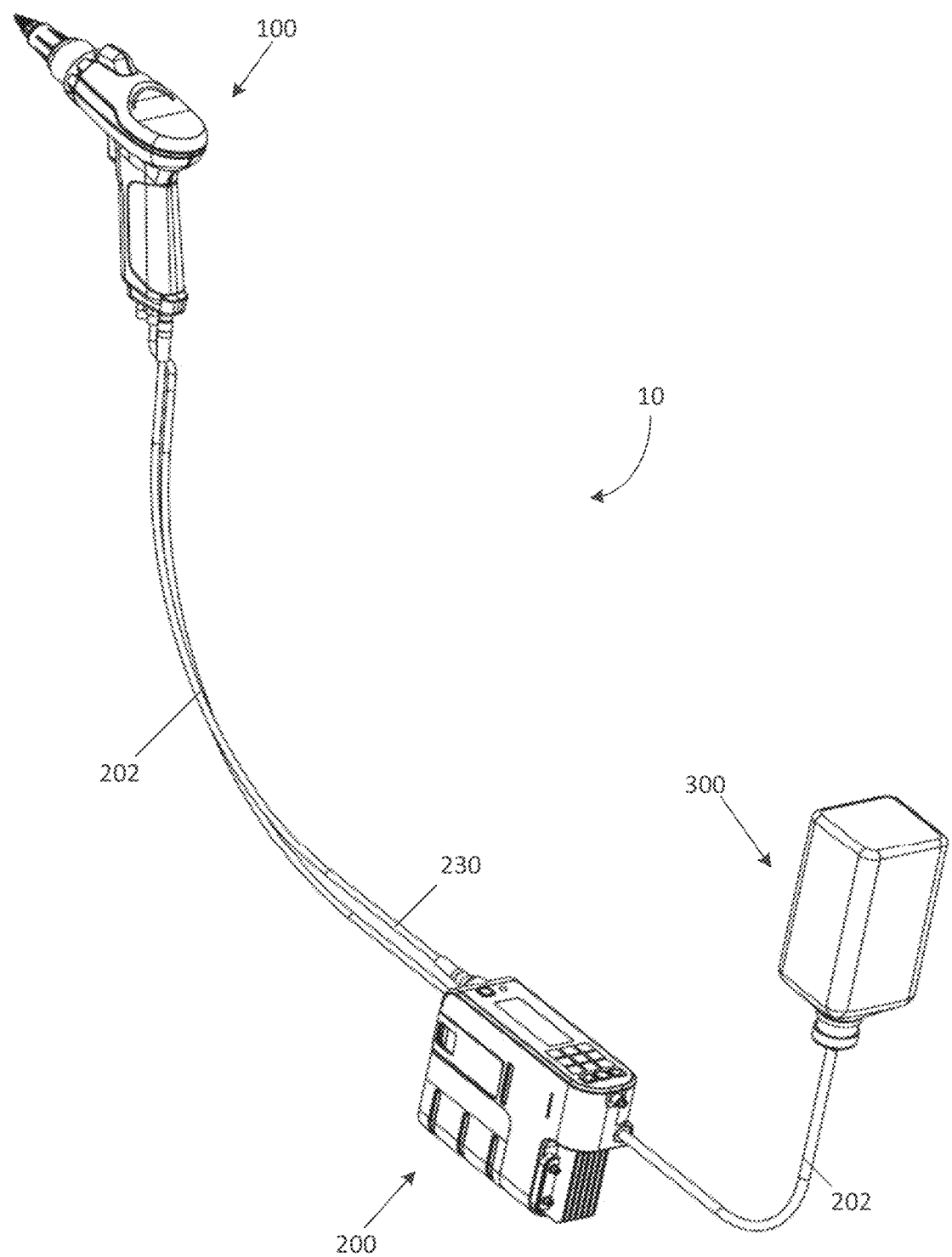
FIG. 1 is a perspective view of an exemplary injection apparatus.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

As used herein, the term "proximal" refers to a position, direction, or portion of a device that is closer to the operator and further away from the administration site. As used herein, the term "distal" refers to a position, direction, or portion of a device that is further away from the operator and closer to the administration site. Thus, for example, proximal motion of a device is motion of the device away from the administration site and toward the operator (e.g., away from the subject's body), while distal motion of the device is motion of the device away from the operator and toward the administration site (e.g., into the subject's body). The terms "longitudinal" and "axial" refer to an axis extending in the proximal and distal directions, unless otherwise expressly defined.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited. As used herein, the term "about" means the listed value and any value that is within 10% of the listed value. For example, "about 100 degrees" means any value between 90-110 degrees, inclusive.

The term "medicament" as used herein refers to any substance that may be administered to a subject. Particular embodiments include, e.g., antibiotics, vaccines, hormones, food supplements, oils, vitamins, minerals, etc. In some embodiments, the medicaments are in liquid form. In other embodiments, the medicaments may be in powdered form and may be mixed with one or more solvents within the two or more containers or prior to being disposed therein. Exemplary medicaments include, but are not limited to: Nectiv® Forte, IC Quadro, ND+IB+EDS, Ornitin Triple, Salmin Plus, *Salmonella* Infantis, Quadractin VP2®, Gumbin® VP2, Natrium ceftiofur, Amikacin, Gentaject, and combinations thereof.

The term "subject" as used herein refers to a human or a non-human animal subject to a treatment, observation, or experiment.

The term "animal" can refer to a land animal, an aquatic animal, an avian, or an amphibian. For example, animals include but are not limited to: poultry, swine, cattle, sheep, goats, ungulates, cats, dogs, and/or aquatic species including fish. In some embodiments, the mammal is a bovine, equine, ovine, porcine, or caprine. A bovine may be a dairy animal or an animal raised for beef. Animals can include animals raised for human consumption or a domesticated animal. Examples of animals that can be fed and/or administered the disclosed combination include, but are not limited to, ruminant species, such as a sheep, goat, cow, heifer, bull, bullock, calf, ox, deer, bison, buffalo, elk, alpaca, camel or llama; ungulates, such as a horse, donkey, or pig; avians, such as chickens, including laying hens and broilers, turkey, goose, duck, Cornish game hen, quail, partridge, pheasant, guineafowl, ostrich, emu, swan, or pigeon; aquatic animals, such as an aquaculture species, such as fish (e.g., salmon, trout, tilapia, sea bream, carp, cod, halibut, snapper, herring, catfish, flounder, hake, smelt, anchovy, lingcod, moi, perch, orange roughy, bass, tuna, mahi, mackerel, eel, barracuda, marlin, Atlantic ocean perch, Nile perch, Arctic char, haddock, hoki, Alaskan Pollock, turbot, freshwater drum, walleye, skate, sturgeon, Dover sole, common sole, wolfish, sablefish, American shad, John Dory, grouper, monkfish, pompano, lake whitefish, tilefish, wahoo, cusk, bowfin, kingklip, opah, mako shark, swordfish, cobia, croaker, or hybrids thereof, and the like), crustaceans (e.g., lobster, shrimp, prawns, crab, krill, crayfish, barnacles, copepods, and the like), or mollusks (e.g., squid, octopus, abalone, conchs, rock snails, whelk, clams, oysters, mussels, cockles, and the like). Additionally, or alternatively, the animal may be a companion animal, such as canines; felines; rabbits; rodents, such as a rat, mouse, hamster, gerbil, guinea pig or chinchilla; birds, such as parrots, canaries, parakeets, finches, cockatoos, macaws, parakeets or cockatiel; reptiles, such as snakes, lizards, tortoises or turtles; fish; crustaceans; and amphibians, such as frogs, toads and newts.

The terms "food supplement," "dietary supplement," and "feed additive" as used herein can refer to products intended to supplement the diet of a subject. Food supplements can include, but are not limited to, vitamins, fatty acids, probiotics, minerals, amino acids, enzymes, herbs and botanicals (including plant materials, algae, macroscopic fungi, and combinations thereof), and other substances.

II. Exemplary Embodiments

Disclosed herein are embodiments of an injection apparatus useable to administer one or more medicaments to a subject (for example, poultry such as chickens, swine, cattle, sheep, goats, ungulates, cats, dogs, and/or aquatic species including fish), either simultaneously or sequentially.

FIGS. 1-12 illustrate an exemplary injection apparatus 10, according to one embodiment. In certain embodiments, injection apparatus 10 is useful for injecting one or more medicaments into a subject. As shown in FIG. 1, a disclosed injection apparatus embodiment 10 can comprise a hand-held unit 100, at least one control unit 200 fluidly coupled to the hand-held unit 100 by at least one connecting tube 202, and one or more containers 300 removably coupled to the at least one control unit 200 and/or the hand-held unit 100 by one or more connecting tubes 202. In some embodiments, the container(s) 300 can be coupled to the hand-held unit 100 and/or the control unit 200 directly. The one or more connecting tubes 202 can be sufficiently flexible to allow a user to maneuver the hand-held unit 100 and the control unit 200 and rigid enough to prevent changes to the volume of the connecting tube, such as widening of the connecting tube due to inner pressure when passing medicaments from a container 300 or the control unit 200 to the hand-held unit. Widening of the tube can cause inaccurate dosing of medicament. Further details of the flexible connecting tubes can be found, at least, in WO 2018/203203, which is incorporated by reference herein in its entirety.

As shown in illustrated embodiments, the one or more control units 200 can be remote from the hand-held unit 100 and can be coupled thereto by one or more connecting tubes 202. In such embodiments, the at least one control unit 200 can be configured to be worn by a user, such as on a belt, in waist bag, a vest, or in a carryon bag. In other embodiments, the one or more control units can be coupled directly to the hand-held unit and/or can be formed integrally with the hand-held unit.

The connecting tube(s) 202 can be flexible enough to allow the user to move the hand-held unit 100 in any direction, long enough to allow the user to fully extend his/her arm holding the hand-held unit 100, and rigid enough (i.e., non-expandable and non-deformable) to prevent widening of the tube due to pressure caused by medicament passing through the tube. Pressure changes have the potential to deform a tube that lacks sufficient rigidity during an administration of medicament, which can lead to inaccurate dosing of the medicament or a delay between the pump action and the administrating of the medicament to the animal. In some embodiments, the connecting tube 202 can flex in all directions and can withstand twisting. In some embodiments, the connecting tube can elastically return to its original shape after being bent, twisted, extended, or otherwise deformed. For example, the tube can have an outer diameter of generally from about 1 mm to 10 mm, and more typically from about 4 mm to 5 mm in size. The internal diameter can be generally from about 1 mm to 5 mm, and more typically from about 2 mm to 3 mm. In some embodiments, the tube can be formed from polymeric materials, such as a polyamide. In some embodiments, the tube can further comprise a spring that allows the tube to have flexibility in all directions while resisting expansion of the tube. The spring can be external to the tube, internal to the tube, and/or formed integrally with the tube.

In some embodiments, the connecting tube may include a casing in conjunction with an elastic tube. In some embodiments, the casing can be formed separately and either wrapped around the elastic tube or placed inside the tube. In other embodiments, the casing can be formed integrally with the tube. In still other embodiments, the elastic tube can be formed of a material having a rigidity capable of withstanding the forces applied by the internal passage of fluids.

In some embodiments, the connecting tube 202 can be fabricated by laser cutting stainless steel to create integral links having a design that allows the tube to be flexible, while preventing radial expansion of the tube. Once laser cut, the resulting laser-cut steel tube is either mounted onto a flexible tube made of polymeric or elastomeric material or coated with such a material.

In some embodiments, the one or more containers 300 can be large containers, such as drums or may have dimensions and/or shapes configured to be worn by a user, such as on a belt, in waist bag, a vest, or in a backpack.

Referring now to FIG. 2, the hand-held unit 100 comprises a head portion 102 and a body 104 having a gripping portion 106 for being held by an operator. The head portion 102 may be removably coupled to the body 104. In some embodiments, the hand-held unit 100 can further comprise a light 108.

In some embodiments, head portion 102 is a detachable and replaceable unit that can be removed and replaced with an identical head portion 102, or, in some cases, with another embodiment of the head portion, as described in more detail below. This enables an operator to switch between needle types (e.g., between needles having differing lengths and/or widths, between subdermal or subcutaneous needles, between stationary and movable needles, etc.), replace damaged needles or head portions, and/or switch out one embodiment of the head portion for another.

Injection apparatus 10 can be configured such that the head portion 102 can be easily removed and replaced, for example, in a field or operation setting. Such a configuration allows an operator to mitigate disruption to the injection process caused by a broken needle or blocked head portion. In some embodiments, the pump can be removed and replaced without the use of tools. For example, the head portion 102 can comprise a connector 103 configured to couple a corresponding connector 105 of the body 104. In some embodiments, the connector 103 can have a threaded receiving portion and the connector 105 can have a correspondingly threaded protruding portion. To remove the head portion 102 (e.g., to replace the head portion 102), the connector 103 can be rotated in a first direction (e.g., counterclockwise) causing the threads of connector 103 to disengage from the corresponding threads of connector 105, thus causing the head portion 102 to disengage from the body 104. To couple the head portion 102 (or a replacement head portion) to the body 104, the connector 103 can be rotated in a second direction (e.g., clockwise) causing the threads of connector 103 to engage the corresponding threads of connector 105, thus coupling the head portion 102 to the body 104. In other embodiments, the corresponding connectors can be, for example, snap-fit or clip connectors.

Figure 3:
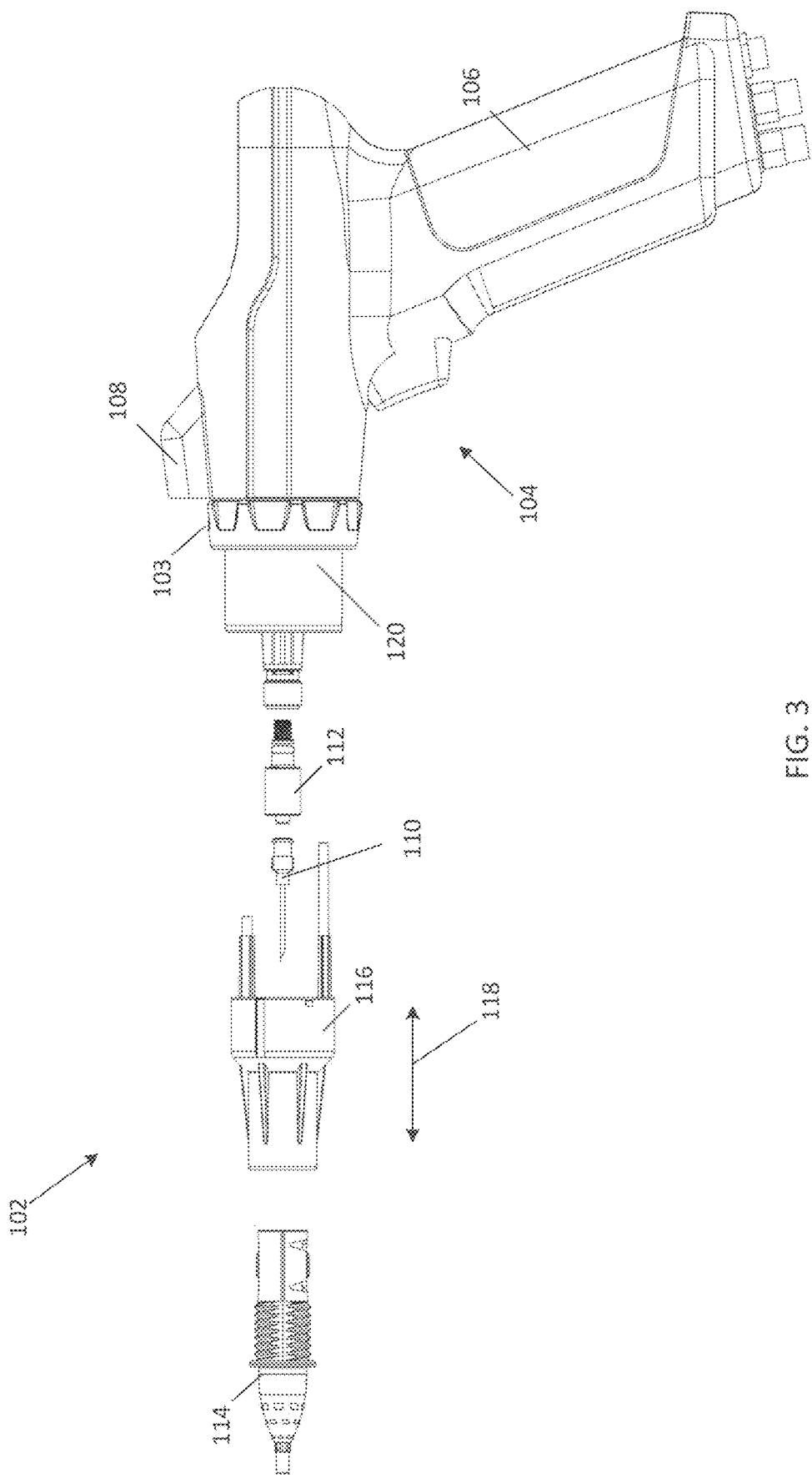
FIG. 3 is a perspective view of the hand-held unit of FIG. 2 with the head portion shown in an exploded view.

As shown in FIG. 3, the head portion 102 can comprise a needle 110 fluidly coupled to the body 104 using a luer lock 112. The needle 110 can be covered by a safety cover 114 which is removably coupled to a movable head 116. The movable head 116 (and therefore the safety cover 114), can be axially movable between an extended position (see e.g., FIG. 2) wherein the distal point (e.g., a distal edge) of the needle 110 is covered by the safety portion and a retracted position (see e.g., FIG. 5) wherein the distal point of the needle 110 is exposed. In some embodiments, the movable head 116 can comprise a biasing member (e.g., a spring, a compressible sleeve, etc.) configured to bias the movable head into the extended position. The movable head 116 can move relative to a support portion 120, as shown by arrow 118. Urging the safety cover 114 (and therefore the movable head 116) rearwardly (i.e., proximally) with respect to the support portion 120 exposes a distal point of the needle 110 and allows the needle to be inserted into the subject's body. In other embodiments, the needle can be movable with respect to the support portion 120, and the movable head 116 and safety cover 114 can be stationary with respect to the support portion 120.

In some embodiments, urging the movable head 116 rearwardly into the retracted position (e.g., by pressing the safety cover 114 against a desired injection location on the subject) triggers the release of a predetermined dose of medicament (e.g., by opening a valve associated with the needle and/or by triggering movement of the pump, as described in more detail below).

Figure 4:
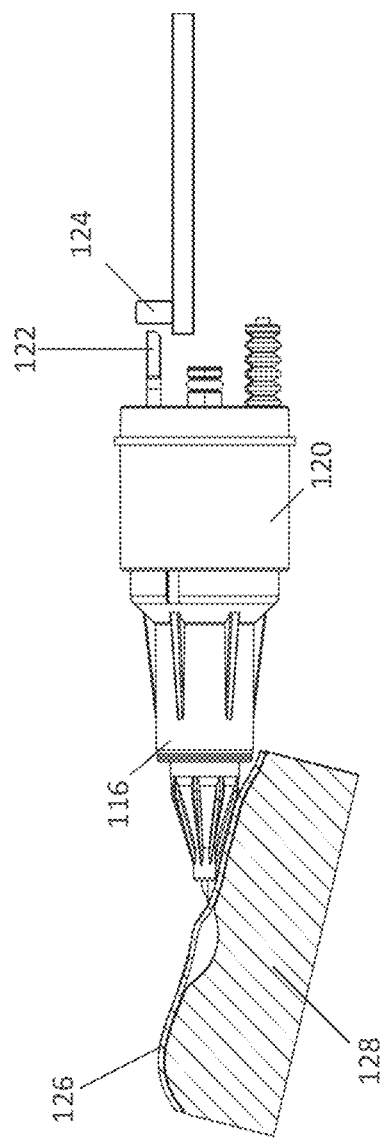
FIG. 4 is a side view of an exemplary head portion for an injection apparatus.
Figure 5:
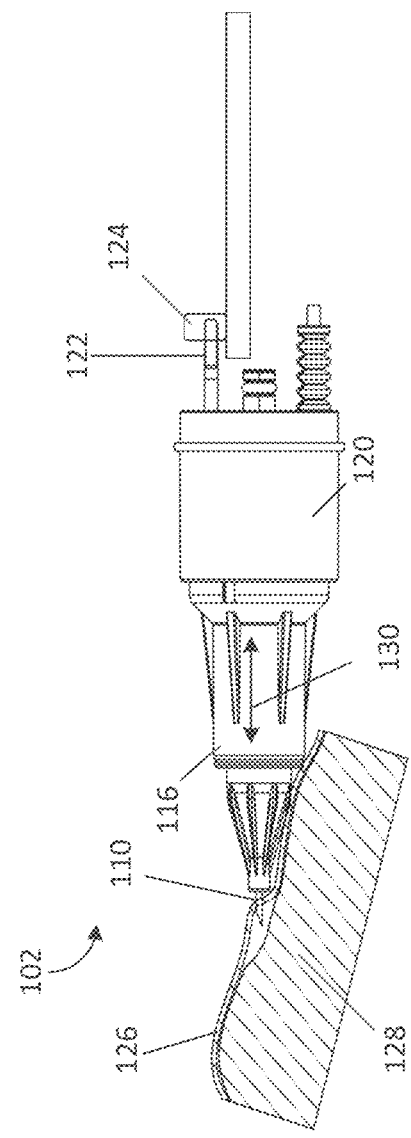
FIG. 5 is a side view of the head portion of FIG. 4 being used in a subcutaneous injection.

Referring now to FIGS. 4-5, in some embodiments, the head portion 102 can be used for subcutaneous injections. Subcutaneous injections require that the needle penetrate the subject's skin 126 but stop prior to penetration of the subject's muscle 128 such that the medicament is deposited between the skin and the muscle. Such injections require that the needle 110 enter almost parallel to the skin 126 (see e.g., FIG. 5). As used herein, unless stated in absolute terms such as "completely parallel," the term "parallel" includes the term "substantially parallel." For example, an object is substantially parallel with respect to a reference object or plane when the object is oriented at an angle of ±20° or less with respect to the reference object or plane.

The movable head 116 can further comprise a protrusion 122 coupled to a proximal end portion of the movable head 116, and the body 104 of the hand-held unit 100 can comprise a corresponding sensor 124. In some embodiments, the sensor can be a photointerruptor. When the movable head 116 retracts as shown by arrow 130, the protrusion 122 engages the sensor 124. In such embodiments, the safety cover 114 can be configured to only partially cover the needle, as shown in FIG. 4, such that the movable head and safety cover can only be retracted a short distance prior to engaging the sensor 124, such as approximately 1 mm. Once engaged, the sensor 124 can trigger the injection of a predetermined dose of measurement. If the needle is removed from the subject prior to the full injection dose being administered, the movable head 116 will bias into the extended position and the protrusion 122 will no longer engage the sensor 124. The injection apparatus can then send an alert that the injection has failed. The alert can be an audible, visual, or tactile alert such as a vibration.

Generally, the medicaments are administered in liquid form. In some embodiments, the containers 300 are provided with a ready-for-use liquid medicament. In other embodiments, the medicament to be administered is administered in a dry form (e.g., as a sprayed powder). In such embodiments the medicament is held within the containers in a dry form. In still other embodiments, the containers 300 are provided with a medicament (e.g., in a dried or powdered form) that needs to be processed or prepared prior to use (e.g. by the addition of water or other solvent thereto). Accordingly, in some embodiments, the containers 300 can be internally divided into two or more compartments for holding one or more powdered medicaments and one or more solvents. Prior to administration of the medicament(s) the one or more solvents can be admixed with the powder to create the ready-for-use medicament. In particular embodiments, medicaments include, but are not limited to: Nectiv® Forte, IC Quadro, ND+IB+EDS, Ornitin Triple, Salmin Plus, Salmonella Infantis, Quadractin VP2®, Gumbin® VP2, Natrium ceftiofur, Amikacin, Gentaject, and combinations thereof.

Referring again to FIG. 1, in some embodiments, the containers 300 can be formed separately and can be removably couplable to the at least one control unit 200 via one or more connecting tubes 202. In some embodiments, each control unit 200 can be fluidly coupled to a respective container 300. The containers can either be refilled or replaced with full containers when emptied. In some embodiments, the containers 300 can be formed integrally as part of the hand-held unit 100, the control unit 200, or both, and can be refilled with a suitable liquid medicament when emptied. In some embodiments, the containers 300 can be made of rigid material (e.g., a metal or a rigid polymeric material). In other embodiments, the containers 300 can be made of flexible material (e.g. a plastic bag or a flexible polymeric material). In some embodiments, the containers 300 can be transparent or substantially transparent, thus allowing a user to see the content and the level of content within. In other embodiments, the containers 300 can be opaque, for example, when the medicament(s) they hold are light-sensitive.

As mentioned above, in some embodiments, each medicament can be injected by pressing the safety cover 114 and therefore the movable head 116 against the subject. In other embodiments, each medicament can be injected by manual actuation of the injection apparatus, for example, by manually pressing and/or pulling a trigger located on the gripping portion of the hand-held unit. Suitable triggers can be, for example, a lever or button. In such embodiments, each press of the trigger will administer a predetermined amount of a medicament, such as by actuating a motor of the apparatus. In some embodiments, the apparatus can be configured to sequentially deliver doses of two or more different medicaments. In such embodiments, a first press of the trigger will inject a selected dose of a first medicament, and a second press of the trigger will inject a selected dose of a second medicament, or alternatively a single trigger press will result in subsequent multiple administrations, such as two or more medicament administrations. In some embodiments, each dose can have the same volume, however, in other embodiments, the volume of the dose can vary (using, for example, an encoder to control the position of a piston within the pump) depending on the medicament being injected, the size of the animal, the species of the animal, or other factors.

As mentioned above, the injection apparatus 10 can comprise one or more control units 200. Each control unit 200 can deliver medicament from a respective container 300 to the hand-held unit 100 and into the subject. For example, each control unit 200 can comprise at least one pump coupled to one or more non-return valves. In the illustrated embodiment, each control unit 200 comprises one pump 204 fluidly coupled to two non-return valves 208, 210.

Suitable non-return valves can be, for example and without limitation, check valves, inlet non-return valves, lift check valves, etc. which allow passage of medicament therethrough in only a single direction. For example, a first check valve can allow passage of medicament from the container 300 to a respective control unit 200 but prevent backflow from the control unit 200 to the container 300, and a second check valve can allow the passage of medicament from the respective control unit 200 to the hand-held unit 100 but prevent backflow from the hand-held unit 100 to the control unit 200. The particular embodiment of FIGS. 6-8 includes valves 208, 210, each comprising a spring 212 and a stopper 214 (which can be any of various shapes including, for example, a sphere, a disk, a cone, etc.). Spring 212 exerts a biasing force against the stopper 214, biasing the valve into a closed position and preventing medicament from flowing through the valve. If the pressure external to the valve (e.g., in connecting tubes 202) is less that the opening (or "cracking") pressure of the check valve (e.g., less than the force exerted by spring 212), the valve remains closed. This can prevent fluid from the containers 300 from flowing into the control unit 200 until the pump is activated to pressurize the fluid and/or prevent fluid from the control unit 200 from flowing into the hand-held unit 100 until desired. If the external pressure is greater than the cracking pressure of the check valve, medicament can push the stopper 214 against the spring 212, compressing the spring and allowing medicament to flow through the valve in one direction.

In other embodiments, the valves can be configured such that they can be actuated electrically (e.g., by a microprocessor) between the open and closed configurations. In still other embodiments, the valves can be configured such that they can be actuated manually (e.g., by pressing a button, flipping a switch, or turning a lever).

Figure 6:
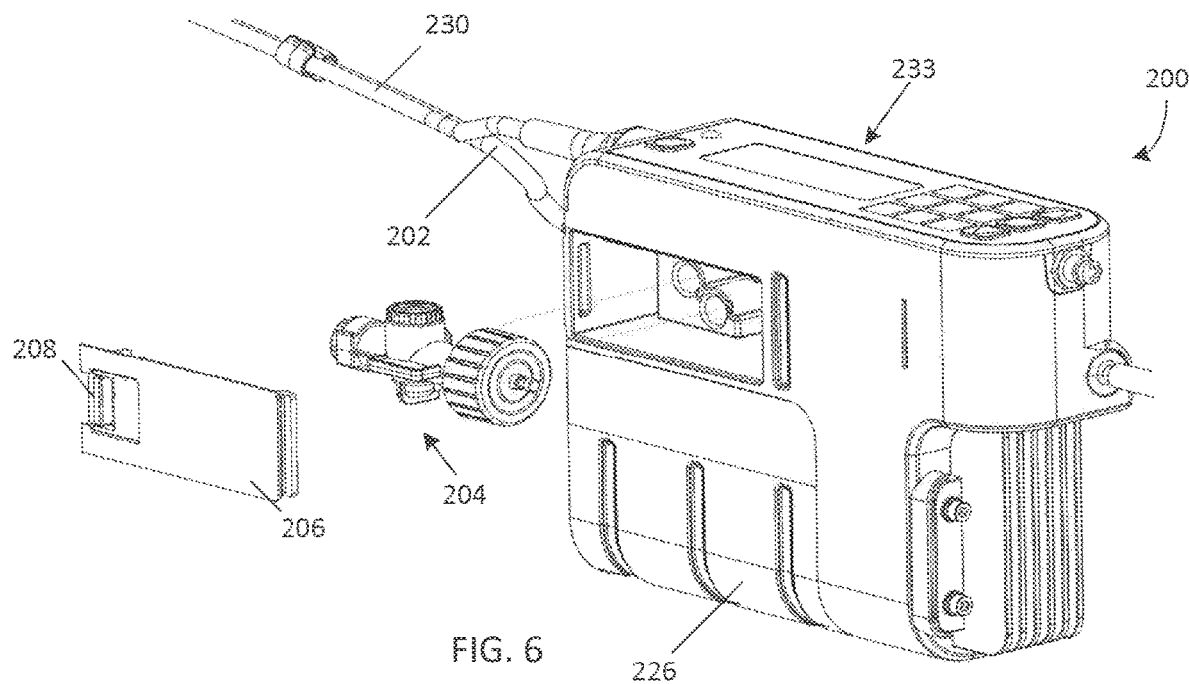
FIG. 6 is a partial exploded view of a control unit of an exemplary injection apparatus with the door and pump removed.

Referring to FIG. 6, in some embodiments, each pump 204 can be removable such that it can be replaced by an identical or similar pump. The control unit 200 can be configured such that the pump 204 can be easily removed and replaced, for example, in a field or operation setting. Such a configuration allows an operator to mitigate disruption to the injection process caused by a blocked and/or malfunctioning pump by quickly and easily replacing the pump with a new pump. In some embodiments, for example, the illustrated embodiment, the pump can be removed and replaced without using tools. The pump 204 can be located behind a door 206 that comprises a latch 208. The latch 208 couples the door to the control unit 200 and prevents the door 206 from opening unless the latch is actuated by a user.

Figure 7:
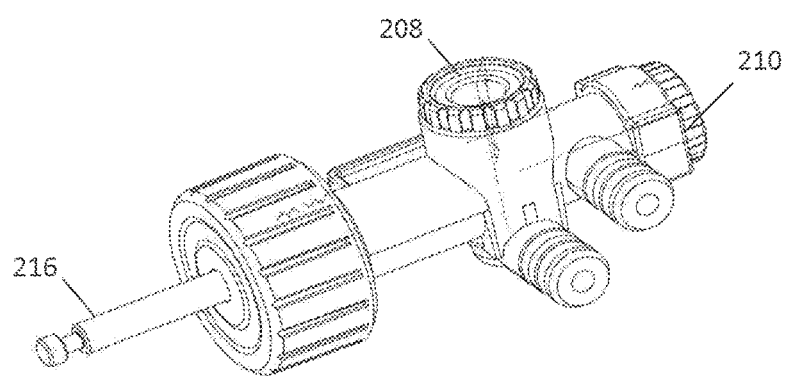
FIG. 7 is a perspective view of a pump of an exemplary injection apparatus.
Figure 8:
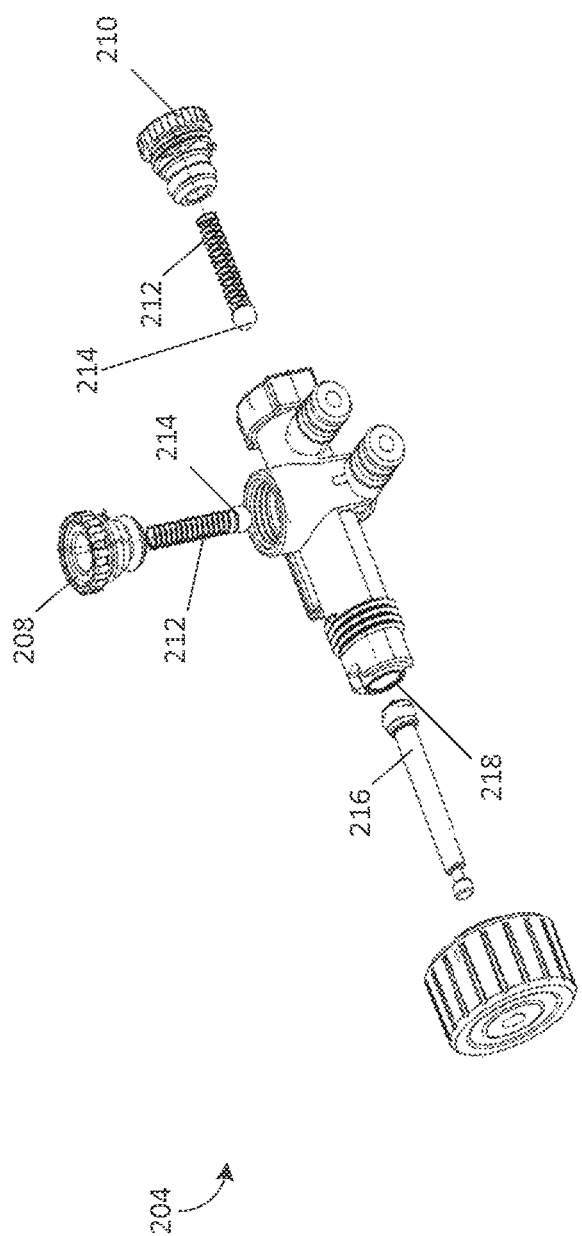
FIG. 8 is an exploded perspective view of the pump of FIG. 7.

The at least one pump 204 can be fluidly coupled to the one or more containers 300 and/or to the hand-held unit 100. The pump 204 can be configured to push/pull the same or different amounts of medicament from each container 300 and deliver those amounts to the hand-held unit 100. As shown in FIGS. 7-8, the pump 204 can be fluidly coupled to the one or more containers 300 by a first non-return valve 208 and can be fluidly coupled to the hand-held unit by a second non-return valve 210.

In some embodiments, each control unit can comprise two or more pumps 204, wherein the number of pumps is identical to the number of containers 300, and wherein each pump 204 is coupled to a discrete container 300. In such configurations, each pump 204 is designed to pull and/or push a predetermined amount of medicament from its respective container 300 and to sequentially deliver the medicament to the hand-held unit 100 and into the subject according to a predefined administration order.

Figure 9:
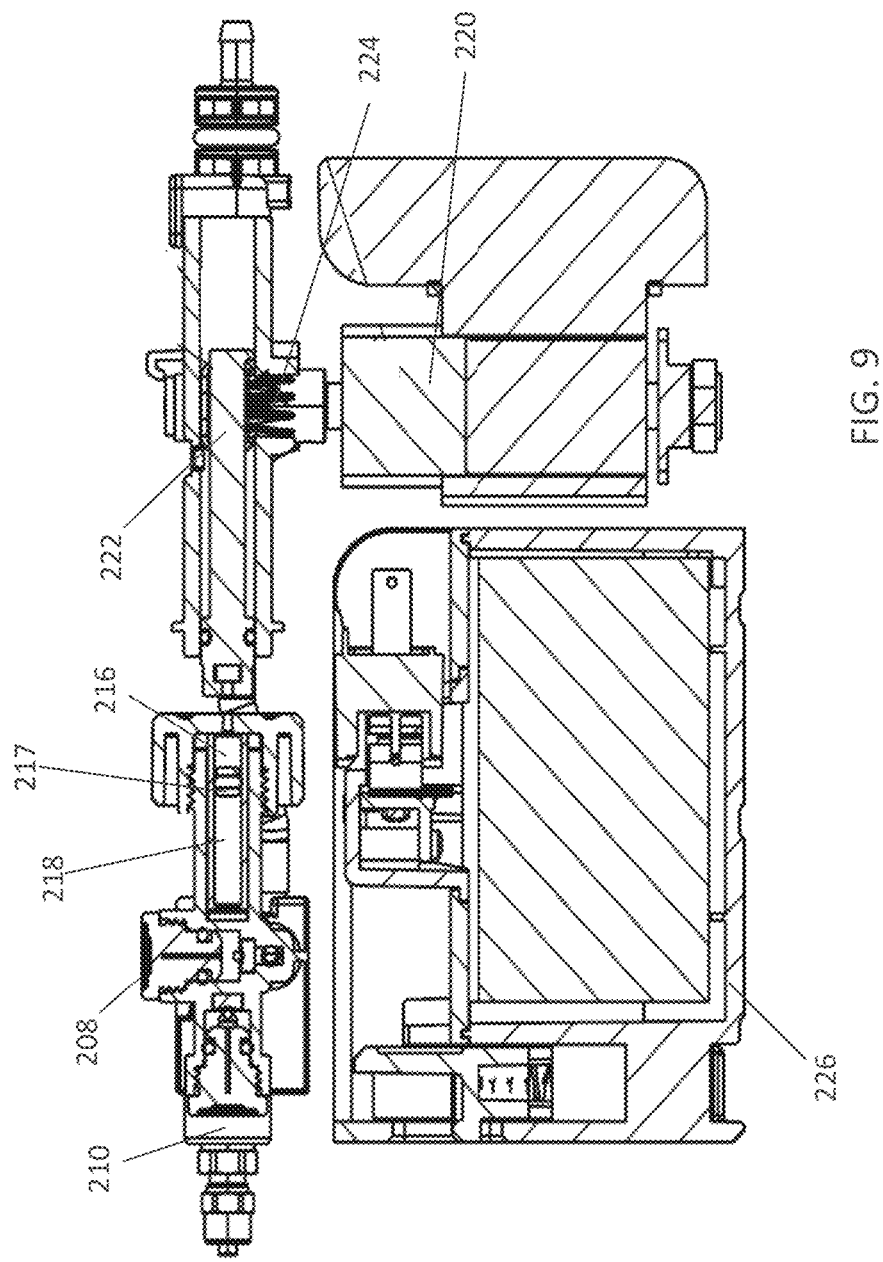
FIG. 9 is a cross-sectional view of a portion of a control unit of an exemplary injection apparatus.

The pump 204 can be a plunger or piston pump. Referring now to FIG. 9, in the illustrated embodiment, the pump 204 is a piston pump having a piston 216 that can selectively extend into the dosing chamber 218. The piston 216 can have a head portion 217. In use, the pump 204 can pull medicament into the dosing chamber through the first non-return valve 208 and can then push the medicament from the dosing chamber to the held-held unit 100. In the illustrated embodiment, the dosing chamber 218 is located in the control unit 200. In other embodiments the dosing chamber can be located in the hand-held unit 100. Further details of exemplary dosing chambers can be found, at least, in WO 2018/203203, which is incorporated by reference herein in its entirety.

The pump 204 can be actuated by a motor 220. The motor can be, for example, a DC motor. The motor 220 can actuate a drive shaft 222 coupled to the piston 216. For example, the motor 220 can have a rotating gear 224 that engages a plurality of corresponding teeth on the drive shaft 222. The motor 220 can further comprise an encoder (not shown) configured to, by controlling the rotation of the motor 220, set the position of the piston head 217 within the dosing chamber and thereby control the volume of the medicament dose to be injected. This function is useful to set different medicament volumes to be injected.

Figure 10:
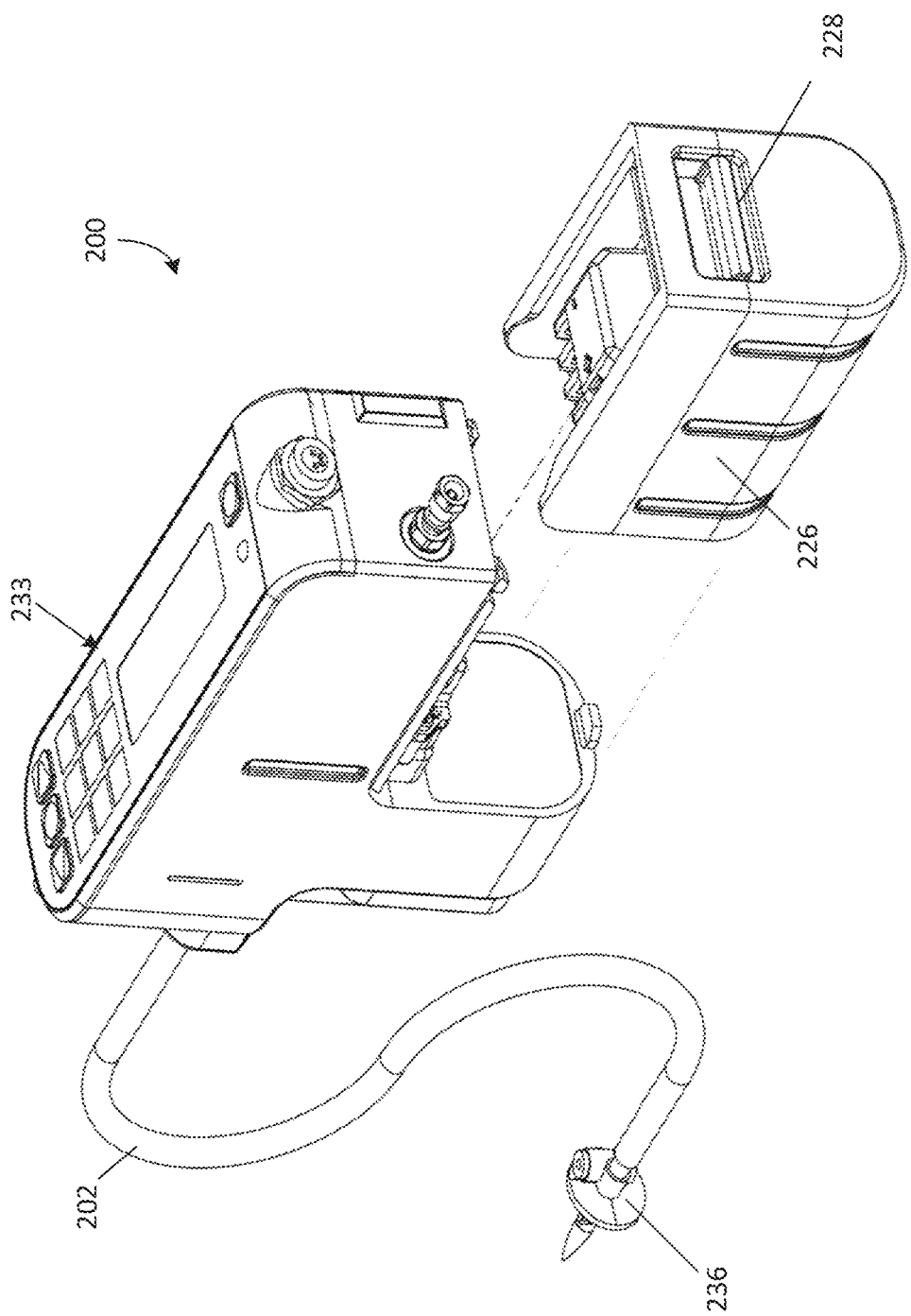
FIG. 10 is a perspective view of a control unit of an exemplary injection apparatus with the power source removed.

In some embodiments, the injection apparatus can be configured to be suitable for remote locations with limited power supply. Referring now to FIG. 10, in the illustrated embodiment, the control unit 200 of the injection apparatus 10 comprises a power source 226. The power source can be, for example, a battery pack, a solar panel, a hydrogen fuel cell, etc. Combinations of power sources can also be used, where the power sources can be the same, such as two battery packs, or different, such as a solar panel and a battery pack. In some embodiments, the power source can be rechargeable. In other embodiments, the power source can be disposable (e.g., disposable batteries). In some embodiments, the injection apparatus 10 further comprises a power-meter configured to display (e.g., on the control unit 200 and/or the hand-held unit 100) the amount of power remaining in the power source 226. The injection apparatus can also be configured to generate an alert (e.g., an audible, visible, and/or tactile alert such as a vibration) when the power source 226 reaches a selected level of power, such as power that could interfere with the correct operation of injection apparatus 10.

The power source 226 can be removably coupled to the control unit 200 and can be configured to provide power to the injection apparatus 10. The power source 226 can comprise a latching portion 228 configured to releasably couple the power source 226 to the control unit 200. In other embodiments, the power source can be coupled to the hand-held unit 10, to a container 300, or can be a separate piece that is operatively coupled to the injection apparatus via one or more power cables. In still other embodiments, the hand-held unit 100 can comprise a second power source configured to provide power to the hand-held unit.

Figure 11:
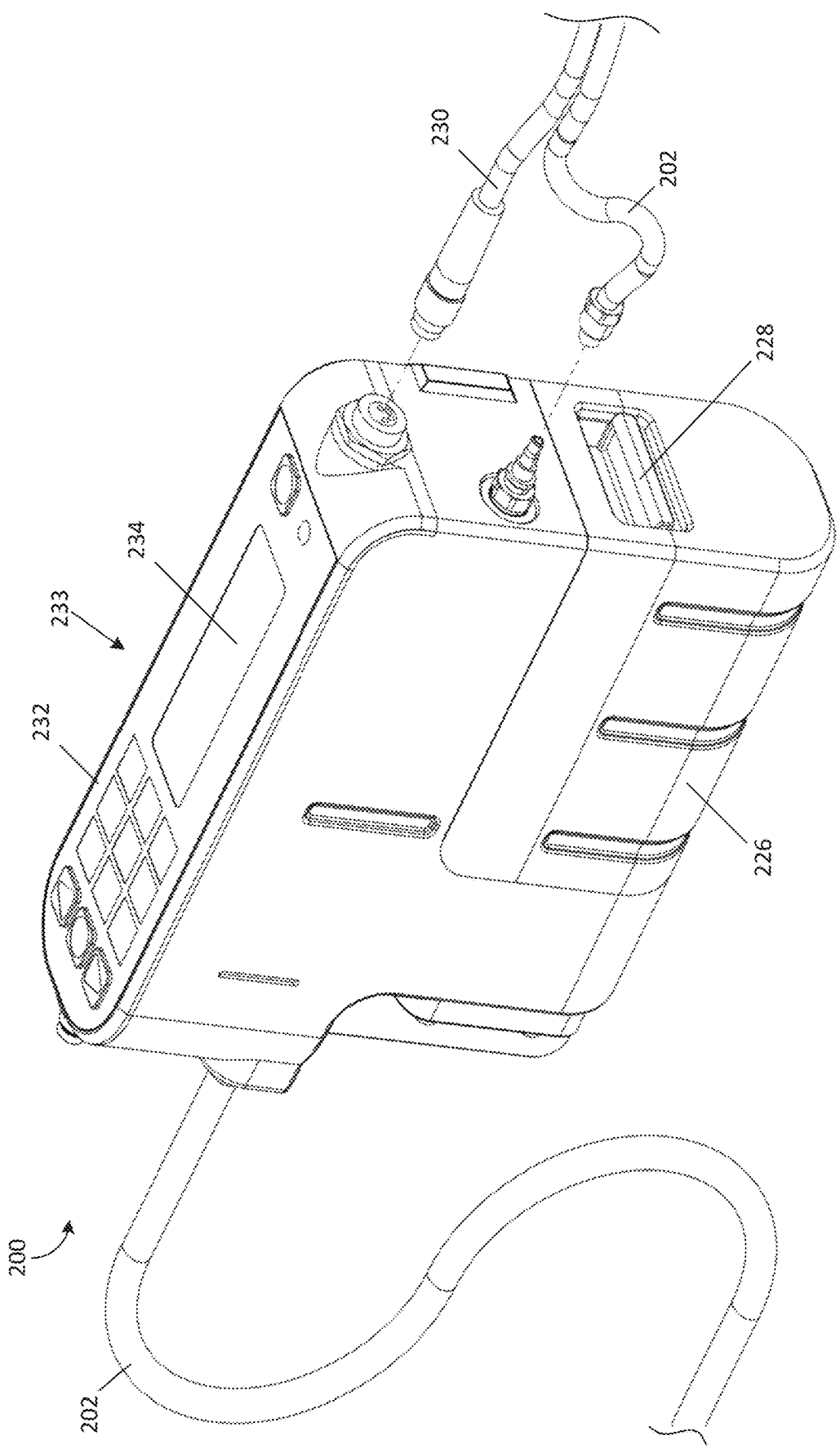
FIG. 11 is a perspective view of the control unit of FIG. 10.

Referring to FIG. 11, the control unit 200 can further comprise one or more cables integral therewith or couplable thereto. In the illustrated embodiment, cable 230 operatively couples the control unit 200 to the hand-held unit 100. The cable 230 is configured to provide power to the hand-held unit 100 and/or to allow for communication between the hand-held unit 100 and the control unit 200. For example, the hand-held unit 100 can send a signal to the control unit 200 when the needle 110 is in position to make an injection.

The control unit 200 can comprise a control panel 233. The control panel 233 can comprise, for example, an input device 232 (e.g., a keypad or a touchscreen) and/or a display 234. The input device 232 can be configured to allow an operator to input a selected medicament dose volume for one or more medicaments and/or a selected injection order for the one or more medicaments. In the illustrated embodiment, the input device comprises a keypad. The display 234 can be configured to display selected information related to an injection process to the operator and/or enable the operator to control various functions of the injection process. The display 234 can display information such as, for example, the amount of medicament remaining in each container, the number of subjects that have received medicament, the total number of injections given, the overall time spent in the injection process, a power indicator such as a battery life indicator), the selected dose volume for each medicament, the selected injection order for the one or more medicaments, etc.

The control unit 200 can be configured to receive and store a selected medicament volume inputted by an operator using the input device 232 and can adjust the motor and pump such that the selected medicament volume is injected for each injection. The control unit 200 can be further configured to receive and store an injection order inputted by an operator and to actuate the pumps 204 in the order dictated by the injection order. In the illustrated embodiment, both the input device 232 and the display 234 are located on the control unit 200. In other embodiments, the input device 232 and/or the display 234 can be located on the hand-held unit 100.

In some embodiments, the control unit 200 can be configured to transmit real-time information to a remote device, thus allowing for data storage and/or remote control of the injection apparatus.

Figure 12:
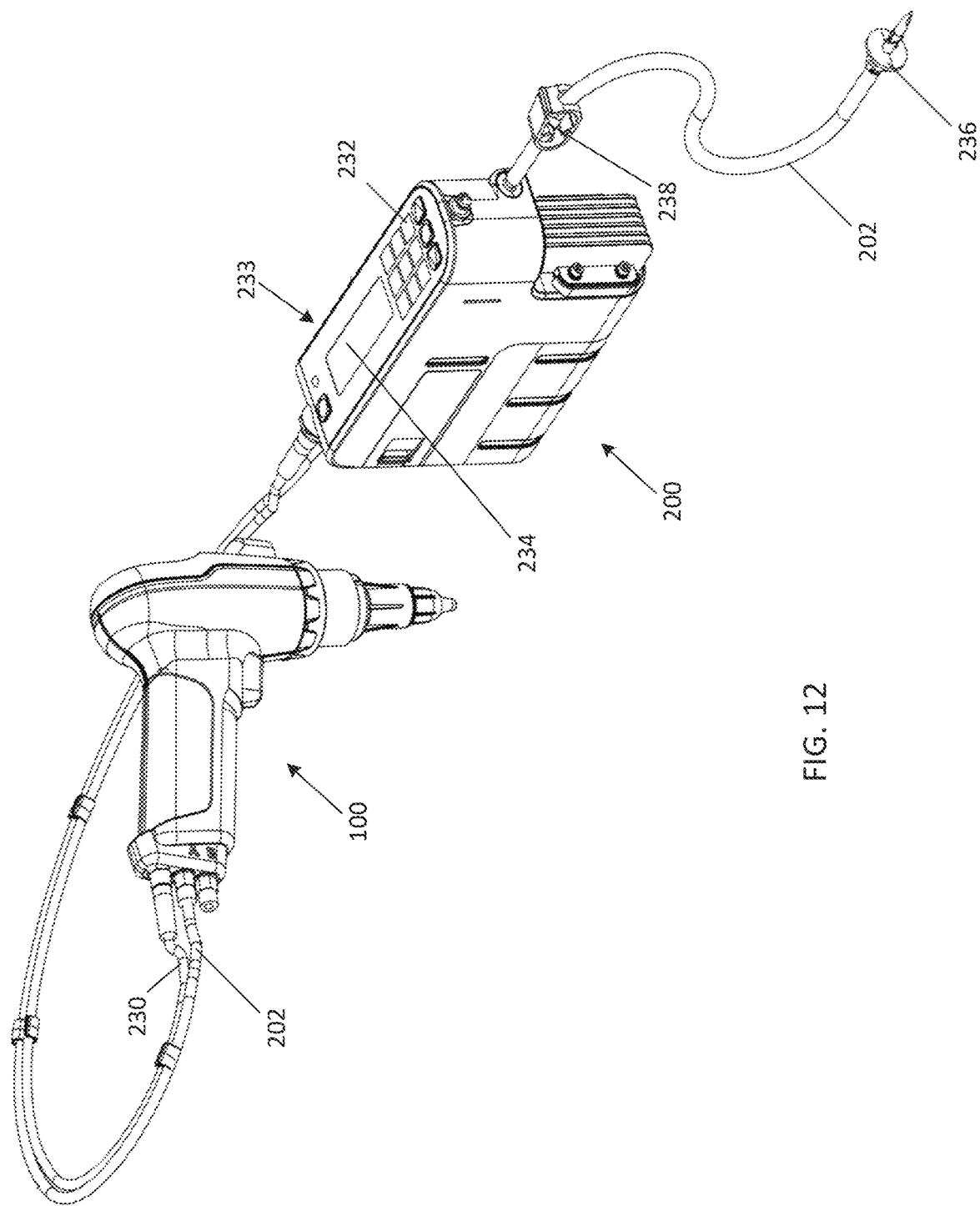
FIG. 12 is a perspective view of an exemplary hand-held unit and control unit.

As mentioned above, the control unit 200 can be fluidly coupled to the one or more containers 300 by one or more connecting tubes 202. Referring now to FIG. 12, in some embodiments, the connecting tube 202 can comprise a puncture device 236 configured to puncture a membrane (not shown) of a respective container 300, thereby allowing fluid flow from the container 300 into the connecting tube 202. In some embodiments, the connecting tube 202 can further comprise a pinch valve 238, for example, a manual pinch valve. The pinch valve 238 can be configured to prevent the flow of fluid from the container 300 to the control unit 200 when actuated by an operator (e.g., by manually pinching the valve).

In some embodiments, each container 300 can comprise a membrane over an opening of the container 300. The membrane prevents medicament from exiting the container. In other embodiments, each container can comprise a valve actuatable between an open configuration and a closed configuration. In the open configuration, medicament can pass through the valve and in the closed configuration medicament is prevented from passing through the valve. In some embodiments, the valves are non-return or check valves which allow passage of fluid therethrough in only a single direction. In other embodiments, the valves can be configured such that they can be actuated electrically between the open and closed configurations. In still other embodiments, the valves can be configured such that they can be actuated manually (e.g., by pressing a button, flipping a switch, or turning a lever).

Figure 13:
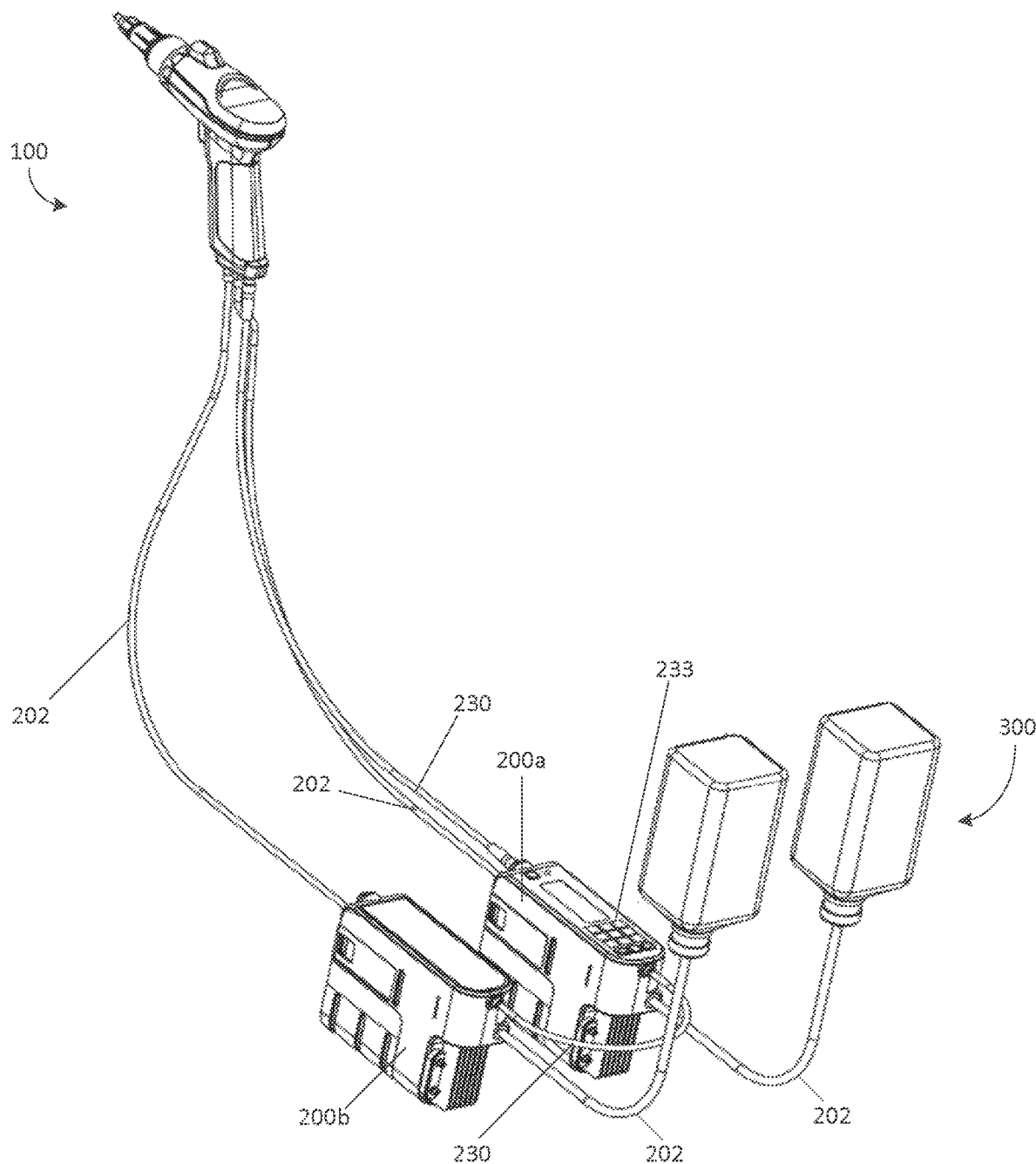
FIG. 13 is a perspective view of an exemplary injection apparatus.

As shown in FIG. 13, in some embodiments, only one of the at least one control units comprises a control panel 233. In such embodiments, the control unit comprising the control panel can be referred to as the primary control unit 200*a* and the one or more control units not comprising a control panel can be referred to as secondary control units 200*b*. An operator can use the primary control unit 200*a* to control apparatus function, such as to set selected medicament volumes for each the primary control unit and the secondary control units. In such embodiments, the primary and secondary control units 200*a*, 200*b* can be communicatively coupled by one or more cables 230. The cable(s) 230 are configured to provide power to the secondary control unit 200*b* and/or to allow for communication between the primary control unit 200*a* and the secondary control unit 200*b*.

In other embodiments, each control unit 200 can have a respective input device configured to set a medicament volume for the respective control unit.

Referring still to FIG. 13, in some embodiments, an injection apparatus can be configured to inject two or more different medicaments into a subject in two or more different locations using a single needle. In such embodiments, the injection apparatus can, for example, comprise three main subsystems: (1) a hand-held unit 100 comprising a single needle; (2) one or more control units 200 each comprising a pump, one or more non-return valves, and a power source; and (3) two or more containers 300 containing different medicaments. Further details of this configuration can be found, for example, in WO 2018/203203.

Referring to FIGS. 14-15, in some particular embodiments, in lieu of head portion 102, the hand-held unit 100 can comprise head portion 400. Head portion 400 can comprise plural needles, with the illustrated embodiment comprising two needles 402, each coupled to a support portion 404 by a luer lock 406. Each needle 402 can be covered by a respective safety cover 408. Each safety cover 408 can be removably coupled to a movable head 410. The movable head 410 (and therefore the safety covers 408), can be axially movable between an extended position (see e.g., FIG. 14) wherein the distal points of the needles 402 are covered by the safety covers 408 and a retracted position wherein the distal points of the needles 402 are exposed. The movable head 410 can move relative to the support portion 404, as shown by arrow 412. Urging the safety covers 408 (and therefore the movable head 410) toward the body 104 (i.e., in a proximal direction) exposes the distal points of the needles 402 and allows the needles 402 to be inserted into the subject's body. In other embodiments, the needles 402 can be movable with respect to the body 104, and the movable head 410 and safety covers 408 can be stationary with respect to the body 104.

In the illustrated embodiment, the needles 402 are positioned a set distance from one another. However, in other embodiments the head portion 400 can be configured such that the distance between the needles 402 can be varied based on the anatomical considerations of the subject.

In some embodiments, urging the movable head 410 rearwardly into the retracted position can be achieved by pressing the safety covers 408 against a desired injection location on a subject. This triggers the release of a predetermined dose of medicament, such as by opening a valve associated with the needle and/or by triggering movement of the pump, as described above.

The removable head portion 400 can be coupled to the body 104 of the hand-held unit 100 by any effective method as will be understood by a person of ordinary skill in the art, such as by using connector 414. Connector 414 can have a threaded receiving portion configured to couple a correspondingly threaded connector 105 of the body 104. To remove the head portion 400 (e.g., to replace the head portion 400 with a new version or to switch to a different head embodiment), the connector 414 can be rotated in a first direction (e.g., counterclockwise) causing the threads of connector 414 to disengage from the corresponding threads of connector 105, thus causing the head portion 400 to disengage from the body 104. To couple the head portion 400 (or a replacement head portion) to the body 104, the connector 414 can be rotated in a second direction (e.g., clockwise) causing the threads of connector 414 to engage the corresponding threads of connector 105, thus coupling the head portion 400 to the body 104.

An injection apparatus 10 comprising head portion 400 can be used to inject two or more medicaments to a single subject simultaneously at discrete injection locations. Each needle 402 can be fluidly coupled to a control unit 200 which is fluidly coupled to a respective container 300, as previously described.

In some embodiments, the head portion 400 can be used for subcutaneous injections. Subcutaneous injections require that the needle penetrate the subject's skin but stop prior to penetration of the subject's muscle such that the medicament is deposited between the skin and the muscle. Such injections require that the needles 402 enter almost parallel to the skin. In such embodiments, the safety covers 408 can be configured such that they do not cover the entire length of the needles 402. In such a configuration, the movable head 410 can retract only slightly when pressed against the skin of the subject, such as approximately 1 mm. The movable head 410 can further comprise a protrusion (not shown) coupled to a proximal end portion of the movable head 410, and the body 104 of the hand-held unit 100 can comprise a corresponding sensor (see e.g., sensor 124 of FIG. 5). When the movable head 410 retracts, the protrusion engages the sensor. Once engaged, the sensor can trigger the release of a predetermined dose of measurement.

Referring to FIGS. 16-24, in some particular embodiments, in lieu of removable head portion 102, the hand-held unit 100 can comprise removable head portion 500. Head portion 500 can, for example, be used to inject medicament into the wing-webs of poultry. For example, head portion 500 can be used to vaccinate chickens against fowl pox using a wing-web injection. The head portion 500 can comprise a needle 502 coupled to a support portion 504 by a luer lock 506. The needle 502 can be covered by a safety cover 508. The safety cover 508 can be removably coupled to a movable head 510 and can comprise a medicament collection sleeve 514 at a distal end portion thereof.

The movable head 510 (and therefore the safety cover 508), can be axially movable between an extended configuration (see e.g., FIG. 17) wherein the distal end portion of the needle 502 is covered by the safety cover 508 and a retracted configuration (see e.g., FIG. 18) wherein the distal end portion of the needle 502 is exposed. The movable head 510 can move relative to the support portion 504, as shown by arrow 512. Urging the safety cover 508 (and therefore the movable head 510) toward the body 104 of the hand-held unit 100 (i.e., in a proximal direction) exposes the distal end portion of the needle 502 and allows the needle 502 to be inserted into the subject's body. In other embodiments, the needle 502 can be movable with respect to the body 104, and the movable head 510 and safety covers 508 can be stationary with respect to the body 104.

In some embodiments, the movable head 510 can comprise a biasing member 516 configured to bias the movable head into the extended position. In the illustrated embodiment, the biasing member 516 is a spring. In other embodiments, the biasing member can be any member configured to bias the movable head into the extended position. The biasing member can be, for example, a compressible elastic sleeve.

Referring now to FIG. 17, the head portion 500 can further comprise an extension portion 518 having a lumen through which the needle 502 extends. The extension portion 518 can extend distally from a distal end portion of the luer lock 506 and can be sized such that it extends into the medicament collection sleeve 514 when the movable head 510 is in the extended configuration as shown in FIG. 17. The diameter of the extension portion 518 can be slightly smaller than that of the collection sleeve 514 such that a fluid-tight seal is formed between the two components at the proximal end of the collection sleeve 514 when the extension portion 518 is within the collection sleeve 514. This allows medicament to collect within the collection sleeve 514 without leaking proximally into the internal cavity of the head portion 500.

Referring now to FIG. 21, the needle 502 can have a lumen (not shown) fluidly coupled to the control unit 200. An annulus wall of the needle 502 defines a divot or groove 520 located at a distal end portion of the needle 502. Groove 520 is in fluid communication with the lumen of the needle 502. The tip portion 522 of the needle 502 (that is, the portion of the needle distal to the aperture) can be closed (e.g., not having a lumen) forming a lip 524. In other words, the lumen can extend axially along the length of the needle and terminate at a proximal end of the tip portion 522. Such a configuration allows medicament to flow through the lumen of the needle 502 and pool within the groove 520, as described in more detail below. The tip portion 522 including lip 524 has a diameter slightly smaller than that of the collection sleeve 514 such that a fluid-tight seal is formed at a distal end of the groove 520 when the needle 502 is within the collection sleeve 514. This allows medicament to collect within the collection sleeve 514 without leaking out the distal end of the injection apparatus.

The head portion 500 can further comprise a sensor (such as sensor 124, described above). When the movable head 510 is in the retracted configuration (e.g., exposing the needle), a protrusion (such as protrusion 122, described above) engages the sensor. When the movable head 510 returns to the extended configuration, the protrusion no longer engages the sensor, thereby triggering the control unit to activate the pump and supply medicament to the hand-held unit. The medicament travels through the needle lumen and into the collection sleeve 514, filling the groove 520. The tip portion 522 of the needle 502 prevents the medicament from exiting the sleeve 514. Once the needle 502 is exposed from the head portion, the medicament is retained within the groove 520 by the shape of the groove and the surface tension of the medicament.

Once the groove 520 is filled, the medicament can be injected into the subject. In the illustrated embodiment, the injection procedure is described with reference to a poultry wing-web injection. However, the head portion 500 and the following method can be used for thin-skin injection of any feed or companion animal (e.g., poultry, swine, cattle, sheep, goats, ungulates, cats, dogs, and/or aquatic species including fish).

Referring to FIGS. 22-24, the injection process can proceed in the following exemplary manner. The safety cover 508 can be pressed against the wing-web 526 of a subject. As the safety cover 508 (and therefore the movable head 510) moves rearwardly with respect to the support portion 504 as shown by arrow 528, the distal end portion of the needle 502 is exposed from the safety cover 508 (as shown in FIG. 23). Referring now to FIG. 24, when needle 502 penetrates the wing-web 526 the groove 524 aligns with the wing-web, thereby allowing the medicament to be absorbed.

The removable head portion 500 can be coupled to the body 104 of the hand-held unit 100 using a connector (not shown). In some embodiments, the connector can have a threaded receiving portion configured to couple a correspondingly threaded connector 105 of the body 104. To remove the head portion 500 (e.g., to replace the head portion 500 with a new version or to switch to a different head embodiment such as head portion 102 or 400), the connector can be rotated in a first direction (e.g., counter-clockwise) causing the threads of the connector to disengage from the corresponding threads of connector 105, thus causing the head portion 500 to disengage from the body 104. To couple the head portion 500 (or a replacement head portion) to the body 104, the connector can be rotated in a second direction (e.g., clockwise) causing the threads of the connector to engage the corresponding threads of connector 105, thus coupling the head portion 500 to the body 104.

As mentioned above, the injection apparatus 10 can be modular, and each embodiment of the head portion can be interchangeable with one or more of the other embodiments of the head portion. For example, head portion 102 can be replaced with head portion 400, and/or head portion 500, or vice versa. In such modular embodiments, the one or more control units 200 and the hand-held unit 100 can be configured to have as many inlets and/or outlets as necessary for the desired number of medicaments.

In certain embodiments, each container 300 of the injection apparatus 10 further comprises an identification marker (not shown). The identification marker can be any suitable marker for conveying information (e.g., an RFID code, a QR-code, a barcode, a color sticker, etc.). In some embodiments, the identification marker indicates, for example, the type of medicament within each container, the amount of medicament that needs to be administered from each container, the manufacturing date, and/or the expiration date. Accordingly, in some embodiments, the injection apparatus further comprises a reader unit configured to read data provided by the identification markers and to transmit the data to the control unit and/or to a remote unit. The reader unit can be located on the hand-held unit 100 and/or on the control unit 200. In such embodiments, an operator can scan each container using the reader unit in a selected injector order, thereby inputting the selected injection order and/or dose volume for each medicament into the control unit 200.

In some embodiments, the reader unit can be configured to emit and receive light. In such embodiments, the identification markers may comprise light-absorbing materials and/or light-reflecting materials. For example, a first container can have a light-absorbing sticker (e.g., a black sticker) and a second container can comprise a light-reflecting sticker (e.g., a white sticker). When a container is coupled to the control unit, the reader unit can read the identification marker in order to distinguish between the first and second containers and determine the contents and/or required dosage for each container. The reader unit can then transmit that information to the control unit and/or a remote unit.

Some disclosed embodiments are configured for use with animals implanted with an RFID tag. The RFID tag of an animal can be scanned to prior to administration, to ensure that the animal has not already received the medicament. During or after the administration process the RFID tag of the animal can be logged and the data transmitted to a control system (e.g., a smartphone, a cloud-based data housing system, or a local server).

When administering medicament to a large number of animals, the user may need to hold the injection apparatus for a long time. Accordingly, in certain embodiments, the weight of the hand-held unit 100 (including either head portion 102 or 400) is configured to be as light as possible. For example, certain disclosed embodiments weigh between about 150 to about 200 grams, such as 160 grams, 170 grams, 180 grams, or 190 grams.

In some embodiments, the injection apparatus further comprises one or more temperature control units for heating or cooling the medicament to be injected. Pre-heating some medicaments to the approximate body temperature of the animal prior to administration can improve medicament absorbance. In some embodiments, each container 300 can have a respective temperature control unit, one or more temperature control units can be positioned along respective connecting tubes 202; one or more temperature control units can be positioned within the hand-held unit 100, or any and all combinations thereof. A temperature control unit used can be selected according to the system requirements. In some embodiments, the heat used to raise the temperature can be generated by the engine or motor of the injection apparatus, and/or by a Peltier device or other thermoelectric cooling apparatus. This can reduce energy consumption, as well as improve cost and performance of the device.

In some embodiments, a small Li-Ion battery can be used to power a Peltier device which supplies heat to or removes heat from the medicament until a desired temperature is reached. Notably, the temperature control unit controls the temperature to prevent overheating of the medicament, which could, in some cases, render it unusable. In this way, the battery energy of the injection apparatus can be used more efficiently since the batteries only need to supply a portion of the heating energy. Peltier devices work best when the "temperature lift" (e.g., the difference in temperature between the hot side and cold side) is kept to a minimum. For example, in some embodiments, the lift can be approximately 10° C., which is low enough to enable the Peltier to operate efficiently. In an exemplary embodiment, a Coefficient of Performance (COP) of approximately 3 can be achieved, thereby reducing the battery requirement to ⅓ of the battery energy required by a "battery only" system. In practical terms, this energy load could be realized by, for example, a Li-ion battery of around 50 g with dimensions of 50×50×10 mm, capacity 2500 mAH, and power 1.8-2 W.

In some embodiments, the Peltier device can be used in conjunction with waste heat from the motor of the injection apparatus by capturing the waste heat and using it as additional heat input to the "cold side" of the Peltier device. In an exemplary motor, the efficiency can be around 60%, and therefore 1-2 W of heat can be generated in the motor body. This additional heat can be utilized by the Peltier device, and thus improve the overall heat pump performance as well as substantially reduce the battery energy budget.

Accordingly, in certain embodiments, the injection apparatus comprises a heat generating unit which is based on a Peltier/pump motor assisted heating. The amount of medicament injected by the Peltier/pump motor assisted heating apparatus is critical. As such, the injection apparatus may require calibration prior to an initial use, or prior to each use. Accordingly, in certain embodiments, the apparatus further comprises a calibration unit for calibrating the location of the piston or the pump, to thereby obtain accurate calibration.

In a specific embodiment, the injection apparatus 10 can be configured to meet any or all of the following requirements:

(1) The apparatus can administer 3 L (approx. 2.55 kg) of medicament within a 6-hour timeframe. The injection rate can be, for example, 60 injections per minute, and the dose volume can be, for example, 0.6 ml, leading to an injection rate of 36 ml per minute. The operator is expected to carry 1 to 2 L of medicament and refill from a central location when required.

(2) The heating system has the capacity to heat 3 kg of medicament.

(3) The medicament is a protein in mineral oil emulsion with a specific heat capacity of 2130 J/kg. The medicament is to be heated to approximately 38° C. For example, if heating from about 28° C. to about 38° C., the total heat requirement is 54315 J or 0.15 kwh ($Q=2.55*2130*10$). In addition, the pumping energy and pump motor cooling should be considered, which could add an extra 40-50,000 J to the energy requirement.

(4) Assuming a 6-hour work day, the heating power required is 2.5 W ($P=54315/(6*3600)$). The pump is also expected to add another about 3 W to the load, and therefore the overall power demand is about 5-6 W.

(5) The liquid temperature at injection is within an accuracy of +/−1° C. of a preselected temperature.

(6) The total weight of the equipment including medicament should not exceed 5 kg in weight and 5 L in volume.

(7) The temperature control system prevents overheating of the medicament by a thermocouple switch.

(8) The temperature control system is safe for the user.

In some embodiments, the injection apparatus can be configured to administer, for example, 3 liters (approximately 2.55 kg) of medicament in a 6-hour time frame. In some embodiments, the container(s) 300 can be sized such that the operator can carry 1 to 2 L of medicament within the container(s) (e.g., in a backpack) and can refill the containers from a central location when required. This prevents the injection apparatus from becoming too heavy for easy transportation by a user. In some embodiments, for example, the weight of the injection apparatus should not exceed 5 kg.

Many known injection apparatuses use manual calibration of the injection dosage, which can result in large deviations within the amount of medicament due to, for example, operator error and the inaccuracy of cylinder measuring techniques. In contrast, in some embodiments of the present apparatus, the encoder can enable radial resolution of a piston drive of 5 degrees, which leads to a linear piston movement of as little as 0.0006 mm. This provides high dosage precision. However, over time dosage deviations can occur due to manufacturing tolerances resulting in cylinder differences and/or certain degrees of freedom between moving mechanical parts that change due to corrosion and abrasion. In certain embodiments, each injection apparatus can be calibrated during manufacturing and additionally calibrated by the end user according to need, prior to each use, or periodically.

Accordingly, in some embodiments, the injection apparatus further comprises an automated calibration system that enables an end user to calibrate the injection apparatus. In such embodiments, the automated calibration system may comprise a sealed container with electrodes at its bottom and top, wherein the dimensions of the container and therefore the distance between the electrodes is known. To calibrate the device, the user turns the injection apparatus to a "calibration mode" such that the device administers (e.g., by injection) a predetermined dose of a testing liquid (e.g., 1 cc of water) into the sealed container. Once the liquid reaches the top electrode, the calibration system notifies the apparatus and stops the injection. The calibration system determines the number of doses that were required to fill the known volume of the container, calculates the volume of each dose, and compares it to the predetermined amount of each dose. This allows the calibration system to determine if there is any discrepancy in the dose amount and enables the calibration system to automatically calibrate the injection apparatus in accordance with the measured discrepancy.

In certain embodiments, the injection apparatus 10, and particularly the at least one control unit 200, is configured to identify malfunctions in the injection procedure, such as partial dosing, clogging, air bubbles within the tubes, leakage, and/or emptying of the containers. The control unit 200 can additionally identify malfunctions within the different components of the injection apparatus, such as low power, faulty pump(s), torn tube(s), etc.

Incomplete dosing and other malfunctions can occur due to human error. For example, a user may withdraw the needle from the subject before all the medicament has been injected. Dosing errors also can occur due to mechanical malfunction. For example, the piston may not move all the way forward within the dosing chamber to expel the medicament, the tubes or the spray nozzle may clog due to dirt or viscosity of the liquid, and air bubbles may infiltrate the system, which may alter the final volume of the injected medicament. Regardless of cause, incomplete injection results in the subject receiving only a portion of the intended dosage of medicament. These malfunctions may prevent accurate injection of a medicament to the subject or prolong the duration of each injection.

In certain embodiments, the injection apparatus further comprises a malfunction-identification system, which can be configured to identify the above-described malfunctions, as well as others, and send an alert to the user. Such a malfunction-identification system can comprise various mechanisms, for example, a probe at the needle or needle head that identifies an early withdrawal of the apparatus prior to the completion of the injection, a probe coupled to the dosing chamber that identifies whether the piston head moves all the way to the end of the dosing chamber, a probe at the piston head that identifies whether the head of the piston moves backwardly before the piston head moves all the way to the end of the dosing chamber (e.g., indicative of an incomplete administration), a sensor that identifies whether the piston does not move or moves very slowly (e.g. using the encoder and an internal clock), which can be indicative of a clog, and/or a sensor that identifies whether the plunger moves too fast (e.g. using the encoder and an internal clock), which can be indicative of an air bubble or leakage. The malfunction-identification system can further function to calculate the remaining amount of medicament in each container (e.g., by multiplying the number of doses by the injection dosage), measure the current used to activate the motor, which can correspond to the presence of an air bubble, leakage or a clog, etc. The malfunction-identification system can further be configured to measure the duration of each dose and/or the electric current used, wherein any additional duration and/or current used beyond a certain amount can indicate clogging within the system, and any decrease in duration and/or current used beyond a certain amount can indicate an air bubble or leak within the system, or the end of the medicament in the container.

In some embodiments, the injection apparatus further comprises an unclogging procedure to remove clogs that may occur within the needle or the connecting tubes. The unclogging procedure can comprise spraying water or other cleaning fluid through the clogged needle, the water or cleaning fluid being contained in a container connected in parallel to the hand-held unit, such that the unclogging procedure can be carried out as part of the administration procedure, without the need to stop and clean the device. For example, in a representative embodiment, an injection apparatus can comprise a hand-held unit fluidly coupled to a control unit that is fluidly coupled to two containers. One container can hold medicament, and the other can hold cleaning solution. In use, the injection apparatus can be configured to alternate between doses of medicament and doses of cleaning fluid, such that a user can inject a dose of medicament to a subject, remove the needle(s) from the subject, expel a dose of cleaning solution (e.g., onto the ground), and continue on to the next subject.

In certain embodiments, two or more hand-held units can be connected to the same set of one or more containers, thereby allowing two or more operators to work side by side to administer medicament from the same containers. In such embodiments, the containers may be coupled to a stationary unit and can have a larger volume than the portable containers described above.

Though the above-referenced embodiments refer to animal subjects, embodiments of the above-disclosed injection apparatus can also be used to inject medicament to human subjects.

Referring to FIGS. 25-28, in another embodiment, an injection apparatus can have a hand-held unit 600, a control unit 700, and one or more containers (not shown) for holding medicament. The containers can be coupled to the hand-held unit 600 via an inlet 620. The hand-held unit 600 can comprise any of above described head portions, such as head portion 102, 400, or 500. In some embodiments, the injection apparatus can be configured to inject a dose of medicament when a trigger is pressed, in other embodiments, the injection apparatus can be configured to inject a dose of medicament when the head portion (e.g., head portion 102, 400, or 500) is pressed against a subject and a trigger is pressed simultaneously. In still other embodiments, the injection apparatus can be configured to inject a dose of medicament when the head portion is pressed against a subject.

The control unit 700 can be similar to control unit 200 and can comprise a first pump 702 having a first piston 704 comprising a plurality of teeth and movable within a chamber 710 between a retracted configuration (see e.g., FIG. 26) and an extended configuration (see e.g., FIG. 25). The first piston 704 can be actuated by a motor (not shown) having a rotating gear 708 configured to engage the plurality of teeth of the first piston 704, thereby moving the first piston distally and proximally relative to the rotating gear 708.

As shown in FIG. 25, the hand-held unit 600 can comprise a second pump 602 having a second piston 604 and a dosing chamber 606 (see FIG. 26). The first pump 602 can be coupled to the second pump 702 via a connecting tube 706 extending between the hand-held unit 600 and the control unit 700.

The second piston 602 can be operatively coupled to the first piston 702 via an actuating member 608 such that movement of the first piston causes corresponding movement of the second piston 604. For example, distally-directed (e.g., pushing) movement of the first piston 702 causes corresponding distally-directed (e.g., pushing) movement of the second piston 602, and proximally-directed (e.g., pulling) movement of the first piston 702 causes corresponding proximally-directed (e.g., pulling) movement of the second piston. The actuating member 608 can be, for example, a wire, cable, and/or a shaft configured to transmit axial (e.g., pushing and pulling) forces from the first pump 702 to the second pump 602. The actuating member 608 can extend through the connecting tube 706.

Referring now to FIGS. 30-31, in some embodiments, the second pump 602 can further comprise a spring 618 operatively coupled to the second piston 604. For example, the biasing member 618 can extend around the body portion of the piston 604 and abut the head portion such that the spring can apply a distally directed force to the head portion of the second piston 604. In such embodiments, proximal movement of the first piston 704 causes corresponding proximal movement of the second piston 604 using the actuating member 608, thus compressing the biasing member 618 (see FIG. 31). Once application of the proximally-directed force terminates (e.g., upon pressing and/or release of a trigger of the hand-held unit 600), the biasing member 618 expands distally, applying a distally-directed force to the head portion of the second piston 604.

For example, in use, the first piston 704 can move proximally, applying proximally-directed force to the actuating member 608 and therefore to the second piston 604. As it moves proximally, the second piston 604 vacates the dosing chamber 606 and compresses the biasing member 618. Medicament can then enter the dosing chamber 606. Once the dosing chamber 606 is full, the proximally-directed force applied to the actuating member 608 can be terminated. Once the proximally-directed force ceases the biasing member 618 will bias into its expanded position, applying a distally-directed force to the second piston 604. The second piston 604 will then move distally, causing corresponding distal movement in the actuating member 608 and the first piston 604. Movement of the second piston 604 within the dosing chamber forces the medicament out of the chamber through the non-return valve 612.

Referring now to FIGS. 27-28, in an alternative embodiment, in lieu of or in addition to the actuating member 608, the injection apparatus can comprise a hydraulic fluid 616 contained within the connecting tube 706. The hydraulic fluid can be, for example, water, mineral oil, or other fluid having no compressibility. The volume of hydraulic fluid 616 can be configured such that when the first piston moves into the extended configuration, as shown in FIG. 28, the hydraulic fluid is pushed out of the chamber 710 and through the connecting tube 706 such that it actuates the second piston 604, causing the second piston 604 to move within the dosing chamber 606 and expel the medicament contained therein. When the first piston 704 moves into the retracted position, the hydraulic fluid is drawn into the chamber 710, thereby releasing the pressure applied to the second piston 604 and allowing medicament to enter the second pump 602.

Referring again to FIG. 25, the second pump 602 can further comprise one or more non-return valves. For example, in the illustrated embodiment the second pump 602 comprises a first non-return valve 610 configured to allow medicament to flow from the one or more containers into the dosing chamber 606 of the second pump 602. The second pump 602 further comprises a second non-return valve 612 configured to allow medicament to flow from the dosing chamber 606 into the needle 614 of the hand-held unit, and therefore into the subject.

The non-return valves can be, for example, check valves, inlet non-return valves, lift check valves, etc. which allow passage of medicament therethrough in only a single direction. The particular embodiment of FIGS. 25-28 includes non-return valves 610, 612 each comprising a spring and a stopper (which can be any of various shapes including, for example, a sphere, a disk, a cone, etc.). The spring exerts a biasing force against the stopper, biasing the valve into a closed position and preventing medicament from flowing through the valve. If the pressure external to the valve is less that the opening (or "cracking") pressure of the check valve (e.g., less than the force exerted by spring), the valve remains closed. This can prevent fluid from the containers from flowing into the hand-held unit 600 until the dosing chamber 606 has been vacated by piston 604 being drawn backwards. The reduced pressure within the dosing chamber 606 created by the retraction of the piston 604 allows medicament to be drawn into the dosing chamber, flowing through the valve in one direction.

The injection apparatus comprising hand-held unit 600 and control unit 700 can be used in the following exemplary manner. The operator can urge the head portion (e.g., head portion 102 or any of the other head portions described herein) against a selected injection site on a subject, thereby moving the movable head into the retracted position and exposing the distal end of the needle. Once the needle has reached a selected depth within the subject, the first pump 702 can automatically inject the medicament. The pump 702 can move into the extended configuration such that the first piston 704 urges the actuating member 608 forward (i.e., distally) against the second piston 604, moving the second piston 604 within the dosing chamber 606 and thereby delivering the medicament to the needle and into the subject's body.

Once the medicament has been injected, the first piston 704 can move into the retracted configuration, pulling the actuating member 608 backwards (e.g., distally) toward the control unit 700 such that the second piston 704 is pulled backward within the dosing chamber 606. The movement of the second piston 704 out of the dosing chamber draws the next dose of medicament into the dosing chamber.

Referring now to FIG. 29, in some embodiments, the injection apparatus comprising hand-held unit 600 and control unit 700 can be configured to inject two different medicaments at two different volumes. In such embodiments, the hand-held unit 600 can comprise a second pump 620 having a piston 622 operatively coupled to the first piston 704 of the first pump 702, as described above. The second pump 620 can further comprise a dosing chamber 624 into which the piston 622 can extend, and a non-return valve 626. The non-return valve 626 can be configured to allow medicament to pass through the non-return valve from the dosing chamber 624 to the needle and into the subject.

The second pump 620 can further comprise two or more electrically actuated valves, each fluidly coupled to a respective container containing medicament. For example, in the illustrated embodiment, the second pump 620 comprises a first electrically actuated valve 628 and a second electrically actuated valve 630. Each valve 628, 630 can be configured to block a respective fluid inlet 632, 634 when in the closed configuration. In the illustrated embodiment, valve 628 is shown in the closed configuration and valve 630 is shown in the open configuration. When a valve, for example, valve 630, is in the open configuration, medicament can flow through the fluid inlet 634 and into the dosing chamber 624. The piston 622 can then actuate, forcing the medicament through the non-return valve 626 and into the needle.

In some embodiments, valves 628, 630 are configured such that two or more medicaments to be injected sequentially (i.e., one after the other). For example, sequential injection can be achieved by opening the first valve 628 and filling the dosing chamber 624 with a first medicament. The first valve can then be closed. The first medicament can then be injected into the subject. Then, second valve 630 can be opened and the dosing chamber can be filled with a second medicament. The second valve 630 can then be closed. The second medicament can then be injected into a subject.

In other embodiments, the valves 628, 630 can be used to facilitate a mixture of medicament. For example, to create a mixture comprising 0.3 ml of vaccine A and 0.5 ml of vaccine B, the following exemplary method can be used. The first valve 628 can be opened while the piston 622 is retracted to pull a volume of 0.3 ml of medicament A into the dosing chamber. The first valve 628 can then be closed and the second valve 630 can then be opened while the piston 622 is retracted to pull a volume of 0.5 ml of medicament B into the dosing chamber. The second valve 630 can then be closed. The mixture can then be injected into the subject by actuating the piston 622 distally such that the 0.8 ml mixture is ejected from the dosing chamber through the needle.

FIGS. 32-34 illustrate another embodiment of a safety cover 800. Safety cover 800 can be used in lieu of or in addition to any of the previously-described safety covers (e.g., safety covers 116, 408, and/or 508) and can be coupled to a movable head 802 (FIG. 35). Movable head 802 can be similar to movable heads 116, 410, and 510 described previously. The safety cover 800 can cover a needle 804, as shown in FIG. 35. The movable head 802 and therefore the safety cover 800 can be axially movable relative to a stationary portion 826 (FIG. 35) between an extended position (see e.g., FIG. 35) wherein the distal point of the needle 804 is covered by the safety portion 800 and a retracted position (see e.g., FIG. 36) wherein the distal point of the needle 804 is exposed.

Referring to FIG. 32, the safety cover 800 comprises a first end portion 806 and a second end portion 808. The first end portion 806 can have a substantially cylindrical shape. The second end portion 808 of the illustrated embodiment has a substantially frustoconical shape tapering from a proximal portion 812 to a distal portion 814. The second end portion 808 comprises an angled cutout 816 extending from the proximal portion 812 to the distal portion 814 and forming an opening 810 (FIG. 33). The angled cutout 816 can be configured to allow a user to press the second end portion 808 of the safety cover 800 against a subject such that the needle 804 is disposed substantially parallel to the subject's skin and such that medicament can be injected subcutaneously, as shown in FIGS. 35-36.

The illustrated safety cover 800 further comprises a restraint portion 818 configured to, when engaged, resist movement of the safety cover 800 relative to the subject. In some embodiments, the restraint portion 818 can comprise one or more projections (e.g., two in the illustrated embodiment) extending into the opening 810 (e.g., extending downwards in the orientation shown in FIG. 32) that are configured to engage the skin of a subject. The term "skin" as used herein includes a subject's skin, feathers, fur, and/or scales. For example, an operator can press the restraint portion 818 against the subject's skin, thus engaging the skin with the restraint portion.

Referring now to FIGS. 35-36, in some embodiments, an injection apparatus 10 comprising safety cover 800 can be used for subcutaneous injections. For subcutaneous injections, the needle penetrates the subject's skin 820 but stops prior to penetrating the subject's muscle 822 such that the medicament is deposited between the skin and the muscle.

In use, the angled cutout 816 of the safety cover 800 can be aligned with and abut the subject's skin, as shown in FIG. 35. The restraint portion 818 (FIG. 32) engages the skin of the subject, for example, by pressing the restraint portion downwards against the skin in the orientation shown in FIG. 35. Once the restraint portion 818 is engaged, the operator can actuate the movable head (and therefor the safety cover 800) to expose the distal point 824 of the needle 804 and insert the distal point 824 of the needle into the subject. In some embodiments, as described above with respect to FIGS. 4-5, medicament can be injected automatically once a preselected length of the needle has been exposed. In other embodiments, the user can manually inject the medicament using a trigger or other actuation mechanism.

Figure 37:
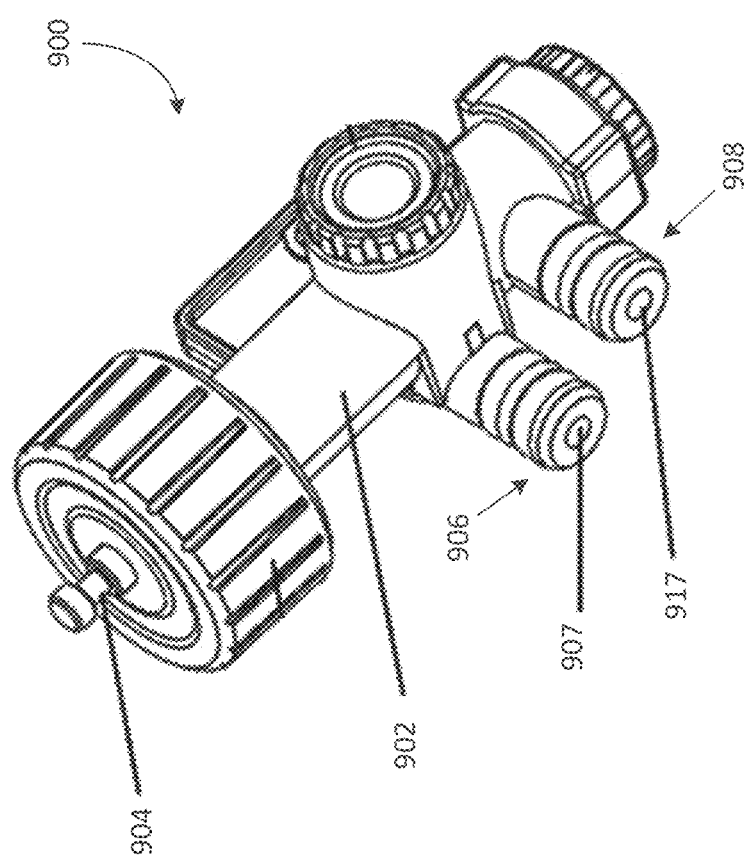
FIG. 37 is a perspective view of a pump of an exemplary injection apparatus.

Referring now to FIGS. 37-39, in some embodiments, in lieu of or in addition to any of the above-described pumps (e.g., pumps 204, 602, 702), an injection apparatus can comprise one or more pumps 900. In some embodiments, the pump 900 can be disposed in a control unit, such as control unit 200. In other embodiments, the pump 900 can be disposed in a hand-held unit, such as hand-held unit 100.

The pump 900 can include a dosing chamber 902, a piston 904, and one or more one-way valves (e.g., two valves 906, 908 in the illustrated embodiment). The pump 900 can be actuated using a motor, such as motor 220 described previously. The motor can actuate a drive shaft (not shown) coupled to the piston 904 in order to move the piston 904 forward or backward relative to the dosing chamber 902. A medicament dose can be drawn into the dosing chamber 902 via inlet valve 906 and can exit the dosing chamber via outlet valve 908, as described in more detail below.

Referring to FIG. 38, the inlet valve 906 can comprise an inlet 907, an opening 910, a biasing member 912 (see FIG. 39), a stopper 914, and an O-ring 916 disposed around a first end portion of the stopper 914. The outlet valve 908 can comprise an outlet 917 (see FIG. 37), an opening 918, biasing member 920 (see FIG. 39), a stopper 922, and an O-ring 924 disposed around a first end portion of the stopper 922. Each O-ring 916, 922 can be sized to help occlude a respective opening 910, 918 in combination with a respective stopper 914, 922. The outlet 917 can be positioned perpendicularly relative to the opening 918 such that a flow of medicament through the opening 918 is perpendicular with respect to a flow of medicament through the outlet 917.

In the illustrated embodiment, biasing members 912 and 920 are springs. In other embodiments, the biasing members can be, for example, compressible elastic sleeves. The biasing members 912, 920 can be configured to bias the stoppers 914, 922 into a first position. In the first position, each stopper 914, 922 can occlude a respective opening 910, 918 thereby preventing the flow of medicament through the opening 910, 918.

In the illustrated embodiment, the stopper 914 has a cylindrical shape with a tapered first end portion. However, in other embodiments, the stopper can have any of various shapes, including, but not limited to, a sphere, a disc, a cone, a cube, a rectangle, a pyramid, a frustoconical shape, etc.

In use, the dosing chamber 902 can be filled in the following exemplary manner. The piston 904 can be moved backward (e.g., in the direction of arrow 903) relative to the dosing chamber 902. As the piston 904 moves backward, the pressure in the dosing chamber 902 is reduced. The pressure within the dosing chamber 902 causes the stopper 914 to move such that it no longer precludes fluid flow through the opening 910, as shown in FIG. 38. Medicament can then flow through the inlet 907, through opening 910, and into the dosing chamber 902 until the chamber is filled. Once the dosing chamber 902 is filled with medicament, there is no longer a pressure differential within the dosing chamber and the biasing member 912 moves to the first position such that the stopper 914 and associated O-ring 916 occlude the opening 910 and further medicament is prevented from entering the chamber.

Once the dosing chamber 902 is filled, the medicament dose can be injected by moving the piston 904 forward, creating a sufficient positive pressure within the dosing chamber 902 to overcome the biasing force of the biasing member 920. This causes the biasing member 920 (and therefore the stopper 922) to retract to a second, or open position such that the stopper 922 no longer occludes the opening 918, as shown in FIG. 39. In the open position, the stopper 922 is moved axially such that at least a portion of the outlet 917 is unobstructed such that medicament can pass through it. The medicament can pass through the opening 918 and out of the pump 900 through the outlet 917 (see FIG. 37). The positive pressure created by the piston 904 pushes the medicament through a connecting tube (such as connecting tube 202) through the needle of the hand-held unit, and into the subject.

In some embodiments, during injection of the medicament, the connecting tube (e.g., connecting tube 202) can expand slightly due to the positive pressure within the tube. Once the injection is complete and the pressure inside the tube is reduced, the tube contracts to its original size. The contraction of the tube to its original size can cause medicament to leak from the needle. In such embodiments, when the biasing member 920 is in the second position, the stopper 922 partially obstructs or occludes outlet 917, thereby reducing the volume of outlet 917. The reduced volume of outlet 917 can correspond to the difference in volume between the expanded volume of the tube and the contracted volume of the tube. In this way, leakage of medicament from the needle tip after an injection is completed can be eliminated or mitigated.

In other embodiments, the valves 906, 908 can be configured such that they can be actuated electrically (e.g., by a microprocessor) between the first and second configurations. In still other embodiments, the biasing members can be configured such that they can be actuated manually (e.g., by pressing a button, flipping a switch, or turning a lever), magnetically, hydraulically, and/or pneumatically.

Figure 40:
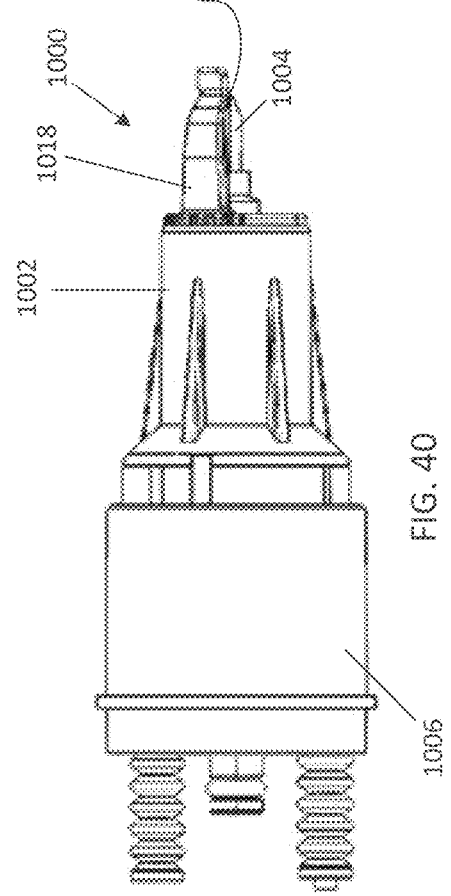
FIG. 40 is a side elevation view of a head portion comprising an exemplary safety cover in the extended position.

FIGS. 40-46 illustrate another embodiment of a safety cover 1000. Safety cover 1000 can be used in lieu of or in addition to any of the previously-described safety covers (e.g., safety covers 114, 408, 508, and/or 800) and can be coupled to a moveable head 1002. Moveable head 1002 can be similar to moveable heads 116, 410, 510, and 802 described previously. The safety cover 1000 can selectively cover needle 1004, as shown in FIG. 40. The moveable head 1002 and therefore safety cover 1000 can be axially moveable relative to a stationary portion 1006 between an extended position (see e.g., FIG. 40) wherein the distal point 1008 of the needle 1004 is covered by the safety cover 1000 and a retracted position (see e.g., FIG. 41) wherein the distal point 1008 of the needle 1004 is exposed.

In some embodiments, the movable head 1002 can comprise a biasing member (e.g., a spring, a compressible sleeve, etc.) configured to bias the movable head 1002 into the extended position to prevent or mitigate the possibility of accidental injection. Urging the safety cover 1000 (and therefore the movable head 1002) rearwardly (i.e., proximally) with respect to the stationary portion 1006 exposes a distal point 1008 of the needle 1004 and allows the needle to be inserted into the subject's body. In some embodiments, urging the movable head 1002 rearwardly into the retracted position (e.g., by pressing the safety cover 1000 against a desired injection location on the subject) triggers the release of a predetermined dose of medicament (e.g., by opening a valve associated with the needle and/or by triggering movement of the pump, as described in more detail below).

Figure 42:
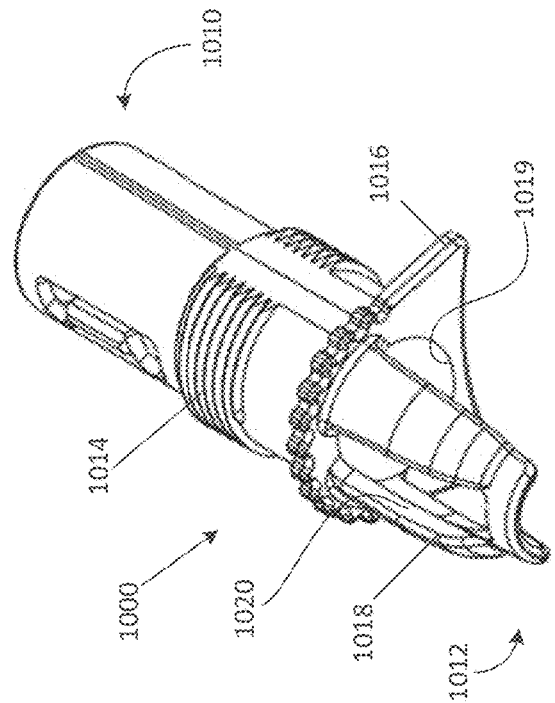
FIG. 42 is a perspective view of the safety cover of FIG. 40.
Figure 41:
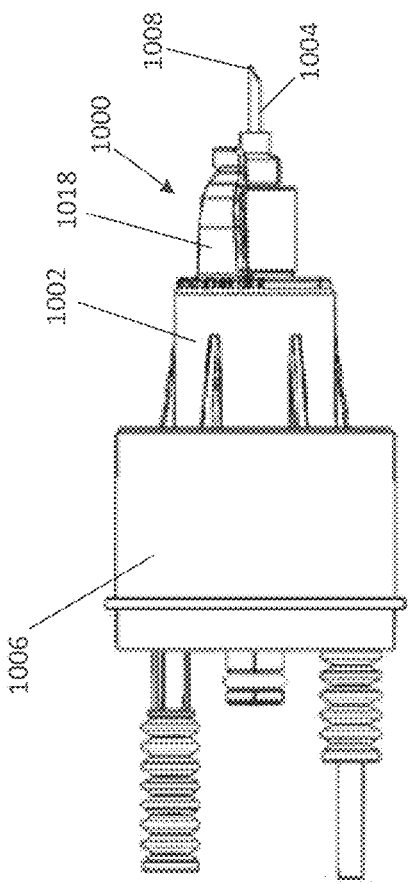
FIG. 41 is a side elevation view of a head portion comprising the safety cover of FIG. 40 in the retracted position.

Referring to FIG. 42, the safety cover 1000 comprises a first end portion 1010 and a second end portion 1012. The first end portion 1010 can have a substantially cylindrical shape and can comprise a threaded portion 1014 configured to couple the safety cover 1000 to the moveable head 1002. The second end portion 1012 can comprise a shoulder portion 1016 and a cover portion 1018. The shoulder portion 1016 can have a first corner 1022, a second corner 1024, and a curved portion 1026. The shoulder portion 1016 can be configured to rest against the body of a subject (e.g., a bird) as the operator pushes the needle 1004 beneath the skin, as described in more detail below with respect to FIG. 44.

Figure 43:
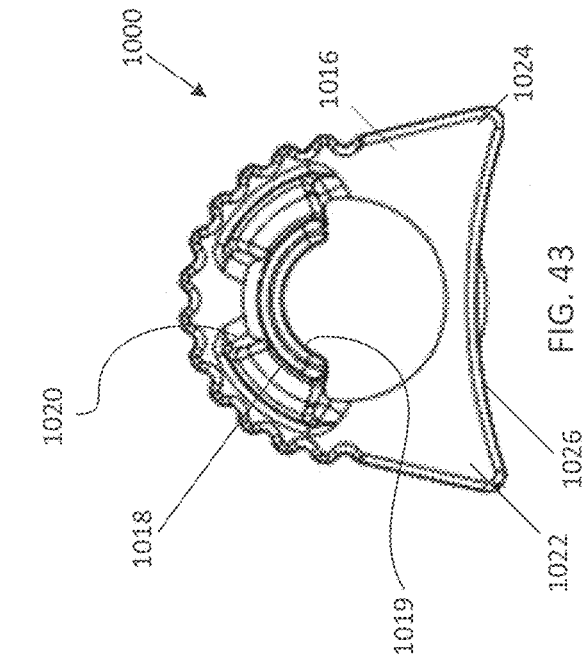
FIG. 43 is a front end view of the safety cover of FIG. 40.
Figure 50:
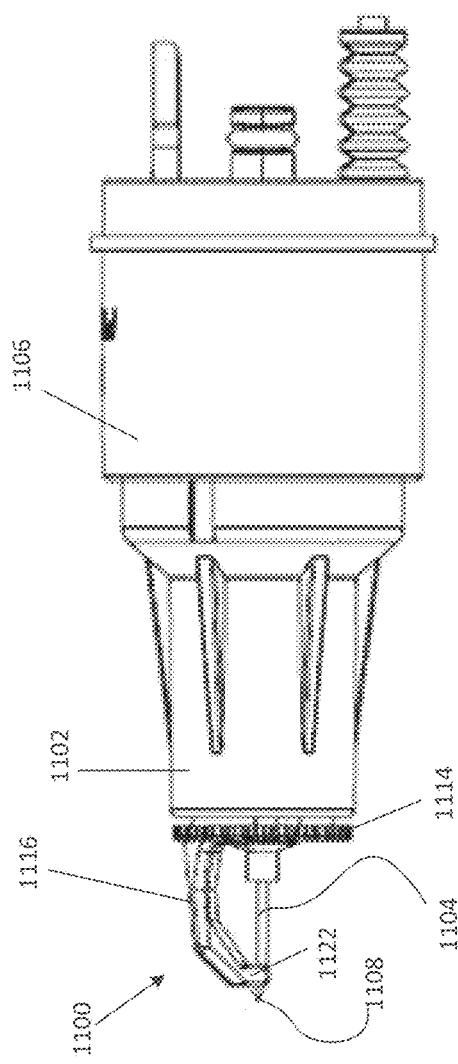
FIG. 50 is a side elevation view of the safety cover of FIG. 47 coupled to a head portion.
Figure 51:
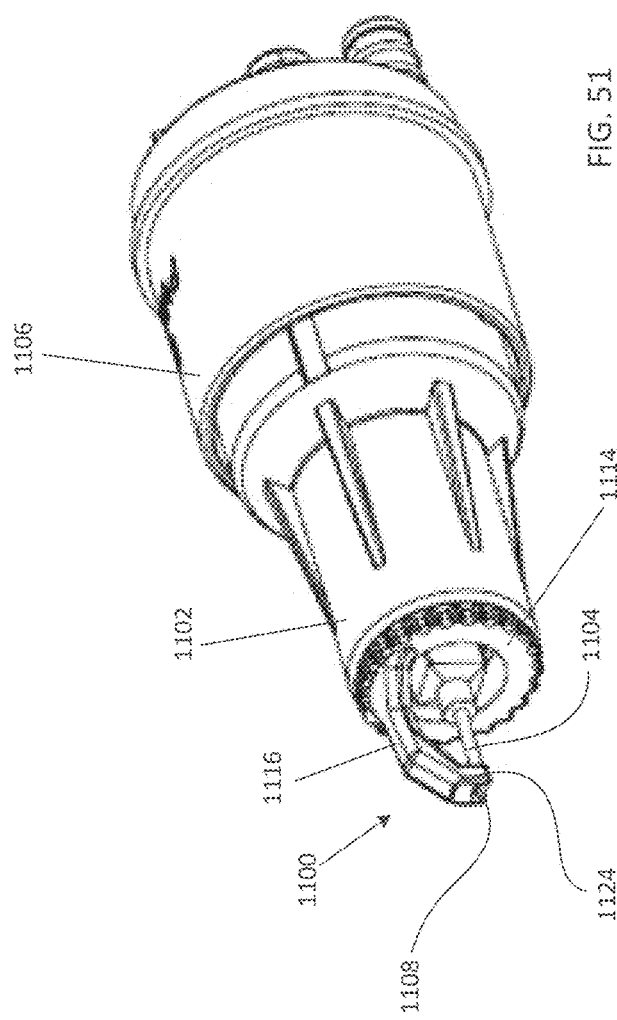
FIG. 51 is a perspective view of the safety cover of FIG. 47 coupled to a head portion.

Referring to FIG. 43, the cover portion 1018 can have a substantially semi-circular shape in cross-section and can define a lumen 1019 through which the needle 1004 can extend. The cover portion 1018 can further comprise a viewing window 1020 configured to allow the operator to see the distal point 1008 of the needle 1004 while the safety cover 1000 is in the extended position, thus allowing the operator to position the distal point 1008 of the needle 1004 at the selected injection location. The viewing window 1020 can be formed within the cover portion 1018 and can extend a length less than the length of the cover portion 1018. In some embodiments, the viewing window 1020 can be an opening or aperture extending completely through a thickness of the cover portion 1018 such that the needle 1004 is visible through the viewing window. In other embodiments, the viewing window 1020 can be a portion of the cover portion 1018 formed of transparent, semi-transparent, or translucent material configured such that the needle 1004 is visible through the viewing window.

Referring now to FIG. 44, in some embodiments, an injection apparatus comprising safety cover 1000 can be used for subcutaneous injections, which require that the needle penetrate the skin but stop prior to penetrate the subject's muscle such that medicament is disposed between the skin and the muscle. For example, the operator can use safety cover 1000 for subcutaneous injection by positioning the cover 1000 such that the needle 1004 is at an angle relative to the subject's skin. In other embodiments, the operator can use safety cover 1000 for muscular injections, for example, by positioning the cover 1000 such that the needle 1004 is perpendicular to the subject's skin.

In use, an operator can align the distal point 1008 of the needle with a selected injection site on a subject by viewing the needle 1004 through the viewing window 1020. As shown in FIG. 44, as the operator pushes the injection apparatus against the subject, one or both corners 1022, 1024 can frictionally engage the subject causing the safety cover 1000 to remain stationary with respect to the subject. In other embodiments, the safety cover 1000 can lack corners. As the operator applies force to the injection apparatus, the safety cover remains stationary relative to the subject, thus exposing the needle 1004 and allowing the needle to enter the subject. Once the needle 1004 is disposed at a selected depth within the subject (e.g., a subcutaneous depth) the medicament can be injected automatically or manually.

FIGS. 47-51 illustrate another embodiment of a safety cover 1100. Safety cover 1100 can be used in lieu of or in addition to any of the previously-described safety covers (e.g., safety covers 114, 408, 508, 800, and/or 1000) and can be coupled to a movable head 1102 (see e.g., FIG. 50). Movable head 1102 can be similar to movable heads 116, 410, 510, 802, and/or 1002 described previously. The safety cover 1100 can extend over a needle 1104 and can be axially movable relative to a stationary portion 1106 (see e.g., FIG. 50) between an extended position (not shown) in which the distal point 1108 of the needle 1104 is covered by the safety cover 1100 and a retracted position (FIG. 50) in which the distal point 1108 of the needle is exposed.

In some embodiments, the movable head 1102 can comprise a biasing member (e.g., a spring, a compressible sleeve, etc.) configured to bias the movable head 1102 into the extended position to prevent or mitigate the possibility of accidental injection. Urging the safety cover 1100 (and therefore the movable head 1102) rearwardly (i.e., proximally) with respect to the stationary portion 1106 exposes a distal point 1108 of the needle 1104 and allows the needle to be inserted into the subject's body. In some embodiments, urging the movable head 1102 rearwardly into the retracted position (e.g., by pressing the safety cover 1100 against a desired injection location on the subject) triggers the release of a predetermined dose of medicament (e.g., by opening a valve associated with the needle and/or by triggering movement of the pump, as described in more detail below).

Referring to FIG. 47, the safety cover 1100 can comprise a first end portion 1110 and a second end portion 1112 and can define a central lumen 1113 through which the needle 1104 can extend. The first end portion 1110 can have a substantially cylindrical shape and can comprise a threaded portion 1115 configured to couple the safety cover 1100 to the movable head 1102. The second end portion 1112 can comprise an annular lip 1114 and an arm member 1116.

The annular lip 1114 can be configured to rest against the body of a subject in order to stabilize the injection apparatus during an injection. In some embodiments, such as the illustrated embodiment, the annular lip can have a substantially circular shape in cross-section and can comprise a plurality of ridges 1118 configured to frictionally engage the skin of a subject (e.g., skin, fur, feathers, and/or scales). In other embodiments, the annular lip 1114 can have any of various shapes. For example, in some embodiments, the annular lip 1114 can comprise a shoulder including one or more corner portions, such as shoulder 1016 with corner portions 1022 and 1024 described previously.

The arm portion 1116 can extend distally from the annular lip 1114. In the illustrated embodiment, arm portion 1116 has a curved or hooked shape, a width that is slightly wider than the width of the needle 1104. The distal end portion 1120 of the arm portion 1116 can include an engagement portion 1122 comprising, for example, one or more projections 1124 (e.g., two in the illustrated embodiment). The projections 1124 can extend toward the surface of the subject (e.g., downwards in the orientation shown in FIG. 47) on either side of the needle 1104 and can be configured to engage the subject to prevent movement of the distal end portion 1120 of the safety cover 1100 relative to the subject during the injection process.

In use, an operator can align the distal end portion 1120 of the safety cover with a selected injection site. The engagement portion 1122 can rest against or be pressed downward into the subject's skin. Once the engagement portion 1122 engages the subject, the operator can actuate the movable head 1102 (and therefore safety cover 1100) to expose the distal point 1108 of the needle 1104 and insert the distal point of the needle into the subject. The low profile of safety cover 1100 can be particularly advantageous when used with feathered subjects wherein it would be more difficult to penetrate the subject's skin using a wider cover.

In some embodiments, the control unit 200 can be configured to receive data from and/or transmit data to a remote device. In such embodiments, the remote device can be configured to store data from, send data to, and/or remotely control the injection apparatus 100. The remote device can be, for example, a general-purpose computer, a hand-held mobile device (e.g., a cell phone or tablet), and/or any type of accessory therefore (e.g., a "smart watch" etc.).

Figure 52:
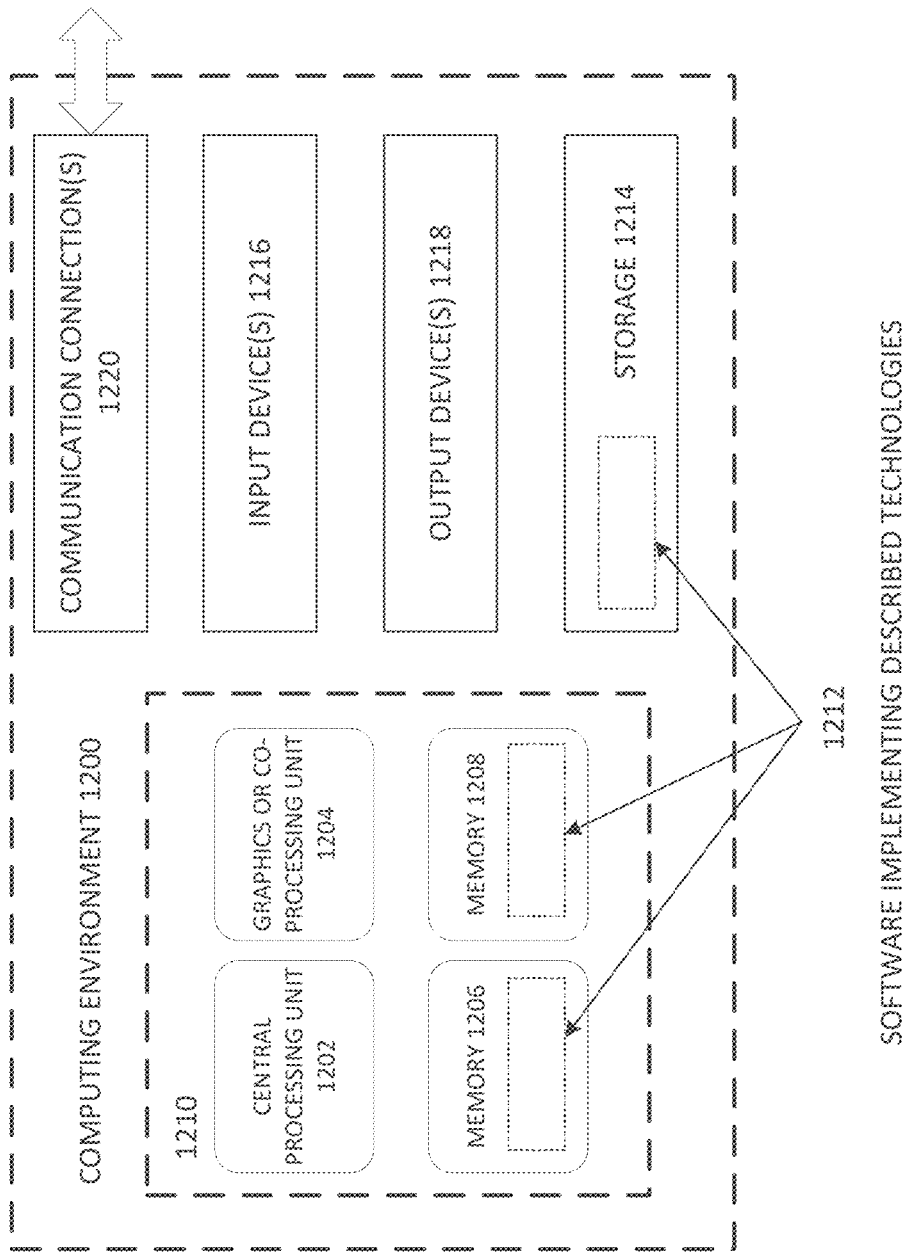
FIG. 52 is a representative diagram of an exemplary computing environment.

The following is a general description of a computing environment suitable for use with the disclosed control unit 200. FIG. 52 depicts a generalized example of a suitable computing environment 1200 in which software and control algorithms for the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer, tablet computer, gaming system, mobile device, programmable automation controller, etc.).

With reference to FIG. 52, the computing environment 1200 includes one or more processing units 1202, 1204 and memory 1206, 1208 (e.g., for storing system input data). In FIG. 52, this basic configuration 1210 is included within a dashed line. The processing units 1202, 1204 execute computer executable instructions. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 52 shows a central processing unit 1202 as well as a graphics processing unit 1204. The tangible memory 1206, 1208 can be volatile memory (e.g., registers, cache, RAM), non-volatile memory (e.g., ROM, EEPROM, flash memory, etc.) or some combination of the two, accessible by the processing unit(s). The memory 1206, 1208 stores software 1212 implementing one or more innovations described herein, in the form of computer-executable instructions suitable for execution by the processing unit(s).

A computing system may have additional features. For example, in some embodiments, the computing environment 1200 includes storage 1214, one or more input devices 1216, one or more output devices 1218, and one or more communication connections 1220. An interconnection mechanism (not shown) such as a bus, controller, or network, interconnects the components of the computing environment 1200. Typically, operating system software (not shown) provides an operating environment for other software executing in the computing environment 1200, and coordinates activities of the components of the computing environment 1200. In some embodiments, the computing system can include virtual network computing (VNC) functionality configured to allow operators to access the control unit 200 and/or computing environment 1200 from a remote location. For example, the computing environment 1200 can have remote dial-in capability. The VNC functionality can allow an operator to remotely access the computing environment in order to, for example, perform maintenance or live monitoring of the injection apparatus 100, or to train an operator on the use of the injection apparatus 100.

The tangible storage 1214 may be removable or non-removable, and includes magnetic disks, magnetic tapes or cassettes, CD-ROMs, DVDs, or any other medium that can be used to store information in a non-transitory way and can be accessed within the computing environment 1200. The storage 1214 stores instructions for the software 1212 implementing one or more innovations described herein (e.g., for storing sequence data, temperature data, template type data, location, date, etc.). In some embodiments, the storage can be a "cloud-based" system configured to store data, allow access to data, and/or generate reports. For example, data logs can be sent to a cloud system and reports can be generated therefrom. Users (including, for example, clients) can access the cloud system remotely through using selected log-in credentials.

The input device(s) 1216 can be, for example: a touch input device, such as a touchscreen display, keyboard, mouse, pen, or trackball; a voice input device; a scanning device; any of various sensors (e.g., the quantity indicator, speed indicator, location unit, etc.); another device that provides input to the computing environment; or combinations thereof. The input device(s) can be remote from the control unit. The output device(s) 1218 can be a display, printer, speaker, CD-writer, transmitter, or another device that provides output from the computing environment 1200.

The communication connection(s) 1220 enable communication over a communication medium to another computing entity. For example, the communication connection(s) can enable communication between the control unit 200 and a remote input device, for example, a phone app, or a computer browser. The communication medium conveys information, such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, Wi-Fi, Bluetooth, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communications means include, for example, the Internet, an intranet, software applications, cable (including fiber optic cable), magnetic communications, electromagnetic communications (including RF, microwave, and infrared communications), electronic communications, or other such communication means.

As mentioned previously, the remote device can include an application, or "app," configured to control the administration process and/or track information relating to the administration process. In some embodiments, the control unit 200 can transmit real-time information to the remote device which can be displayed by the app. In some embodiments, multiple control units 200 from multiple devices can transmit real-time information to the same remote device.

The display can be configured to display a graphical user interface (GUI) comprising one or more data outputs (e.g., an injection count, an error count, an injection rate, a medicament volume tracker, an alert/alarm display, a power level display, etc.) from one or more injection apparatuses 100. In some embodiments, the display can be a touchscreen display/UI and is configured to accept user input(s). The display can have any configuration suitable to display one or more of: (1) system input information such as medicament type; (2) system output information such as an injection counter, an injection rate, a medicament volume, a power level, a medicament temperature, an environmental temperature, and/or an error counter; (3) instructions to a user; (4) alerts/alarms; or (5) any combination thereof. In some embodiments, the display can be configured such that a user can input data to the control unit 200 via the display.

Figure 55:
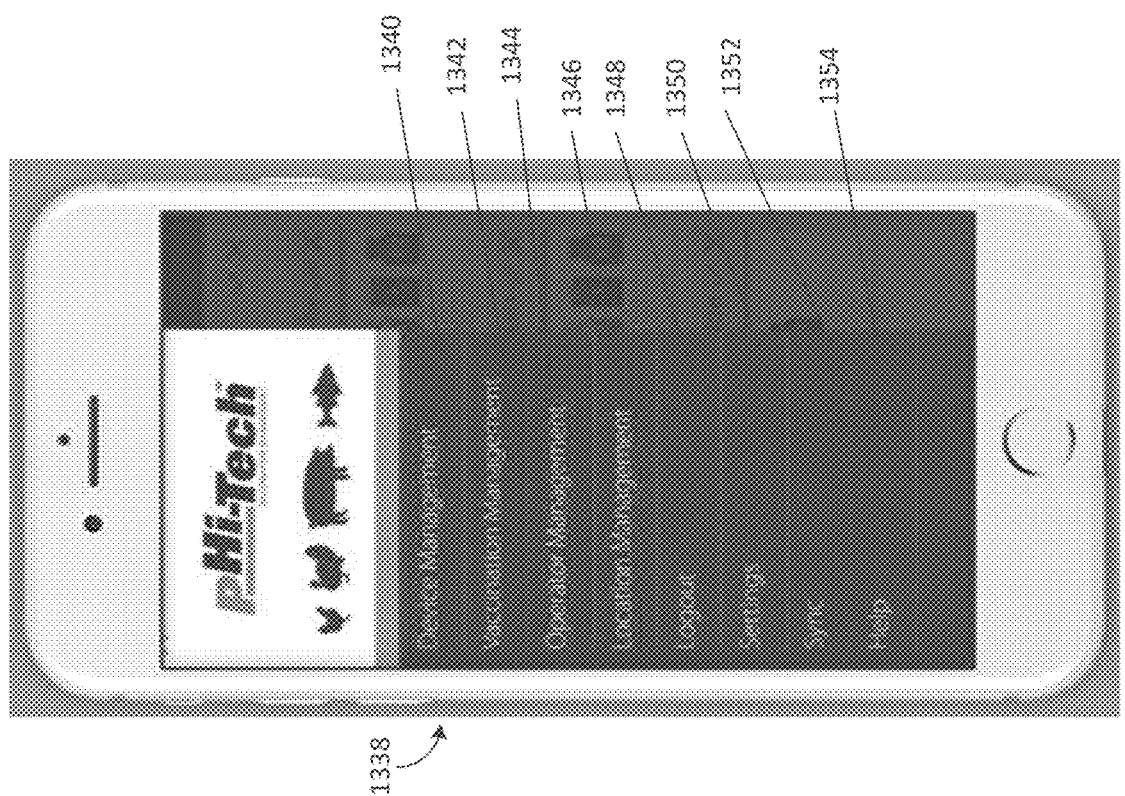
FIG. 55 is an embodiment of a graphical user interface that includes a navigation menu.

FIGS. 53-55 show an embodiment of an exemplary graphical user interface (GUI) 1300. Though the following GUI is described with reference to a smartphone 1302, it should be understood that the GUI can also be displayed on any of the other various devices described previously. In the illustrated example, the GUI 1300 can include a navigation bar 1304 including one or more navigation buttons 1306, and a device management pane 1308 comprising one or more device panes 1310 configured to display data related to a selected injection apparatus 100. For example, in the illustrated embodiment, the device management pane 1308 comprises three device panes 1310, each displaying data related to a selected device. In other embodiments, the device management pane 1308 can display a greater or fewer number of device panes 1310.

Each device pane 1310 can display, for example, an injection count, an injection rate, and an error count for the respective injection apparatus. Each device pane 1310 can further display icons corresponding to one or more power sources 1312 and/or one or more medicament containers 1314. The power source icons 1312 can indicate the power level of a respective power source and the medicament container icons 1314 can indicate the volume of medicament within a respective medicament container. In some embodiments, each device pane 1310 can further indicate the name of the operator using the selected injection apparatus 100.

By pressing on a specific device pane 1310 a user can open a device sub-pane 1316, as shown in FIG. 54. The device sub-pane 1316 can display further details of the selected injection apparatus (e.g., a power source percentage 1318 and/or a volume measurement for the medicament containers 1320) and/or can allow a user to make changes to the selected injection apparatus. For example, a user can enter a designation for the injection apparatus (e.g., a number or name) in a first input pane 1322, can enter a name and/or location for the operator using the injection apparatus in a second input pane 1324, and can select an injection mode for the apparatus (e.g., single, dual, alternate, manual, auto, or any combination thereof) in a third input pane 1326, for example, comprising a plurality of buttons 1328. A user can further input (e.g., by hand or by scanning a bar code or label such as a Near Field Communication (NFC) tag or a Radio Frequency Identification (RFID) tag) the one or more medicaments to be injected by the injection apparatus 100 in a fourth input pane 1330. The user can further input a location (e.g., breast, wing, etc.) and type (e.g., intramuscular, subcutaneous, etc.) for the injections, in a fifth input pane 1332. The user can then transmit the information to the control unit 200 of the selected injection apparatus 100, or to all injection apparatuses in the same section that are in the communication range, by pressing the send button 1334. A user can return to the device management pane 1308 by pressing a return or back arrow 1336.

Referring to FIG. 55, in some embodiments, pressing the navigation button 1306 on the GUI 1300 opens a navigation menu 1338. A user can press the listed options (e.g., device management 1340, vaccination management 1342, operator management 1344, location management 1346, logout 1348, settings 1350, sync 1352, help 1354) to open one or more respective display panes. For example, by pressing the listed option labeled "Device Management" a user can open the device management pane 1308 shown in FIG. 53.

The GUI can further be configured to display one or more alerts and/or alarms related to the selected device panes 1310 shown on the device management pane 1308.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An injection apparatus, comprising:

a hand-held unit having a body portion and a head portion removably coupled to the body portion, the body portion comprising a gripping portion extending at an angle relative to the head portion, the head portion comprising a support portion, at least one needle coupled to the support portion, a movable head movable axially relative to the support portion, and a safety cover removably coupled to the movable head, the safety cover being axially movable between a first configuration wherein a distal point of the needle is covered and a second position wherein the distal point of the needle is exposed, the safety cover comprising an angled opening extending from a distal end of the safety cover and a restraint portion, the angled opening configured to abut a subject and the restraint portion being configured to engage the subject to prevent movement of the subject relative to the safety cover; and at least one control unit remote from the hand-held unit, configured to be worn by a user, and fluidly coupled to the hand-held unit via one or more connecting tubes, the at least one control unit comprising a pump having a piston.

2. The injection apparatus of claim 1, wherein the head portion comprises a threaded portion configured to engage a correspondingly threaded portion of the body portion.

3. The injection apparatus of claim 1, further comprising:
a protrusion extending from the head portion rearwardly toward the body portion;
a sensor coupled to the body portion, wherein when a selected length of the at least one needle is exposed from the movable head the protrusion engages the sensor, and when engaged, the sensor is configured to inject a medicament.

4. The injection apparatus of claim 3, wherein the medicament comprises Newcastle disease inactivated vaccine, IC Quadro, ND+IB+EDS, Ornitin Triple, Salmin Plus, Salmonella Infantis, poultry multivalent inactivated viral vaccines for Newcastle disease, infectious Bursal disease, infectious bronchitis, and reo viral arthritis, Natrium ceftiofur, Amikacin, Gentaject, and combinations thereof.

5. The injection apparatus of claim 1, wherein the movable head comprises a collection sleeve configured to collect medicament within the movable head, and wherein the needle comprises a groove configured to hold a selected dose of medicament.

6. The injection apparatus of claim 1, further comprising one or more medicament containers fluidly coupled to the at least one control unit.

7. The injection apparatus of claim 1, further comprising at least one control panel located on the at least one control unit and configured to allow an operator to input medicament dose volumes for one or more medicaments.

8. The injection apparatus of claim 1, wherein the pump is removably coupled to .

9. The injection apparatus of claim 1, wherein the pump comprises two or more non-return valves.

10. The injection apparatus of claim 1, wherein medicament is administered automatically upon insertion of the at least one needle to a selected depth within a subject.

* * * * *